United States Patent
Bhasin et al.

(10) Patent No.: US 10,230,600 B2
(45) Date of Patent: Mar. 12, 2019

(54) PERFORMANCE ANALYSIS AND BOTTLENECK DETECTION IN SERVICE-ORIENTED APPLICATIONS

(71) Applicant: Oracle International Corporation, Redwood Shores, CA (US)

(72) Inventors: Malkit Singh Bhasin, Chino Hills, CA (US); Herbert Stiel, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 266 days.

(21) Appl. No.: 14/975,100

(22) Filed: Dec. 18, 2015

(65) Prior Publication Data

US 2016/0182328 A1    Jun. 23, 2016

Related U.S. Application Data

(60) Provisional application No. 62/094,909, filed on Dec. 19, 2014.

(51) Int. Cl.
*H04L 12/26* (2006.01)
*H04L 12/24* (2006.01)

(52) U.S. Cl.
CPC ........ *H04L 43/067* (2013.01); *H04L 41/5035* (2013.01); *H04L 43/04* (2013.01);
(Continued)

(58) Field of Classification Search
CPC ............. H04L 43/067; H04L 41/5035; H04L 43/0817; H04L 43/04; H04L 43/0876; H04L 43/65; H04L 41/044
See application file for complete search history.

(56) References Cited

U.S. PATENT DOCUMENTS 9,201,716 B1   12/2015 Leonard
2001/0012291 A1   8/2001 Verbil et al.
(Continued)

FOREIGN PATENT DOCUMENTS

TW    201140471    * 11/2011

OTHER PUBLICATIONS

Magalhaes et al. "Adaptive Profiling for Root-Cause Analysis of Performance Anomalies in Web-Based Applications", 2011 10th IEEE International Symposium on Network Computing and Applications (NCA), Aug. 25-27, 2011, https://doi.org/10.1109/NCA.2011.30.*

(Continued)

*Primary Examiner* — Aftab N. Khan
*Assistant Examiner* — James Ross Hollister
(74) *Attorney, Agent, or Firm* — Kilpatrick Townsend & Stockton, LLP

(57) ABSTRACT

Techniques are disclosed for assembling statistics for diagnosing performance and scalability issues in SOA systems. Key statistics related to key points in a SOA system, for key activities during processing of transactions in the SOA system, are collected and aggregated. The statistics may include message flow rates and latency at key points in the system during a time interval, and execution times for key activities in the system during the time interval. The statistics for the time interval may be added to corresponding cumulative statistics, and persisted to storage. Reports may be generated based upon the statistics to present to a user. Automated processes may be implemented to use the statistics to identify the existence and likely cause of SOA application performance issues, and potentially to attempt to remediate the issues.

20 Claims, 31 Drawing Sheets

(52) U.S. Cl.
CPC ...... *H04L 43/0817* (2013.01); *H04L 43/0876* (2013.01); *H04L 41/044* (2013.01); *H04L 43/065* (2013.01)

(56) References Cited

U.S. PATENT DOCUMENTS

| | | |
|---|---|---|
| 2002/0069281 A1 | 6/2002 | Dillenberger et al. |
| 2005/0047783 A1 | 3/2005 | Sisto et al. |
| 2009/0157872 A1* | 6/2009 | Pinkston .................. G06F 8/20 709/224 |
| 2009/0177692 A1* | 7/2009 | Chagoly ............ G06F 11/0709 |
| 2009/0216874 A1* | 8/2009 | Thain .................... G06Q 10/10 709/224 |
| 2010/0183304 A1 | 7/2010 | Spector |
| 2011/0051604 A1 | 3/2011 | Nishimura |
| 2011/0078300 A9* | 3/2011 | Grelewicz ........... G06F 11/3428 709/224 |

OTHER PUBLICATIONS

Magalhaes et al. "Adaptive Profiling for Root-Cause Analysis of Performance Anomalies in Web-Based Applications", 2011 10th IEEE International Symposium on Network Computing and Applications (NCA), Aug. 25-27, 2011, https://doi.org/10.1109/NCA.2011.30. (Year: 2011).*

* cited by examiner

FIG. 8

Example SOA System Endpoint Statistics

| Domain | Partition | Composite | Type | Cum Count | Snapshot Count | TPS | Latency |
|---|---|---|---|---|---|---|---|
| Domain 1 | Partition 1 | Composite 1 | SERVICE | 2000 | 30 | 100 | 30 |
| Domain 1 | Partition 1 | Composite 3 | REFERENCE | 2000 | 30 | 20 | 40 |

*FIG. 11*

Example SOA System Statistics: Backups in External Queues

| Domain | Partition | Composite | Type | Queue | Backlog | Active |
|---|---|---|---|---|---|---|
| Domain 1 | Partition 1 | Composite 1 | Service | Queue 1 | 10 | 5 |
| Domain 1 | Partition 1 | Composite 1 | Reference | Queue 2 | 8 | 2 |

FIG. 12

Example SOA System Endpoint Statistics

| Domain | Partition | Composite | Type | Cum Count | Snapshot Count | TPS | Latency |
|---|---|---|---|---|---|---|---|
| Domain 1 | Partition 1 | Composite 2 | REFERENCE | 3000 | 20 | 10 | 100 |

*FIG. 13*

Example SOA System Statistics:
Backlog in Internal Queues

| Domain | Partition | Composite | Type | Backlog | Active |
|---|---|---|---|---|---|
| Domain 1 | Partition 1 | Composite 1 | BPEL | 10 | 5 |
| Domain 1 | Partition 1 | Composite 2 | BPEL | | |

*FIG. 14*

Example SOA System Statistics:
Composite Backlog

| Domain | Partition | Composite | Component | Added | Removed | Closed | Faulted | Backlog | Active |
|---|---|---|---|---|---|---|---|---|---|
| Domain 1 | Partition 1 | Composite 2 | BPEL 1 | 50 | 50 | 45 | 0 | 5 | 5 |
| Domain 1 | Partition 1 | Composite 2 | BPEL 2 | 60 | 60 | | 0 | | |

FIG. 15

Example SOA System Statistics:
Business Process Statistics

| D | P | Composite | Component | Cum | Snapshot | Min | Max | Avg | Dehydrated | Total |
|---|---|-----------|-----------|-----|----------|-----|-----|-----|------------|-------|
|   |   | Composite 1 | BPEL 1 | 1000 | 20 | 50 | 100 | 75 | 0 | 75 |
|   |   | Composite 1 | BPEL 2 | 1000 | 20 | 50 | 1000 |  | 0 |  |

*FIG. 16*

Example SOA System Statistics:
Business Process Activity Statistics

| O | P | Composite | Component | Activity | Line No | Min | Max | Avg |
|---|---|---|---|---|---|---|---|---|
| | | Composite 1 | BPEL 2 | Assign1 | 20 | 5 | 7 | 6 |
| | | Composite 1 | BPEL 2 | Transform1 | 40 | 800 | 900 | |
| | | Composite 1 | BPEL 2 | Invoke1 | 60 | 50 | 1000 | 75 |

*FIG. 17*

Example SOA System Statistics:
Business Process Instance Statistics (Completed Instances)

| D | P | C | Component | Cum | Snapshot | Min | Max | Avg | Dehydrated | Total |
|---|---|---|-----------|------|----------|-----|-----|-----|------------|-------|
|   |   |   | BPEL A    | 1000 | 20       | 50  | 100 | 75  |            | 600100 |

FIG. 19

Example SOA System Statistics:
Business Process Instance Statistics with Dehydration Details

| D | P | C | Component | Activity | Cum | Snapshot | Line Number | Avg Dehydration Time |
|---|---|---|-----------|----------|------|----------|-------------|----------------------|
|   |   |   | BPEL A    | Receive 1 | 1000 | 10       | 40          | 4000                 |
|   |   |   | BPEL A    | Receive 2 | 1000 | 10       | 60          | 3000                 |

*FIG. 20*

Example SOA System Statistics:
Business Process Instance Statistics (Incomplete Instances)

| D | P | C | Component | Cum | Snapshot | Active | Dehydrated | Activity | Is Dehydrated |
|---|---|---|-----------|-----|----------|--------|------------|----------|---------------|
|   |   |   | BPEL A    | 1000| 20       | 75     | 10000      | Receive 1| YES           |

FIG. 21

Example SOA System Statistics:
Database Activity Statistics (Internal)

| Activity Name | Process Name | component_type | composite | domain | Start_Count | Completed_Count | Min_Execution_Time | Max_Execution_Time | Avg_Execution_Time |
|---|---|---|---|---|---|---|---|---|---|
| load-instance | BPELProcess1 | BPEL Service Engine | ProjectB | default | 42 | 42 | 0 | 0 | 0 |
| glue-requests-store | SubProcess3 | BPEL Service Engine | ProjectB | default | 6 | 6 | 3 | 5 | 5 |
| load-instance | SubProcess3 | BPEL Service Engine | ProjectB | default | 24 | 24 | 0 | 0 | 0 |
| glue-requests-store | BPELProcess1 | BPEL Service Engine | ProjectB | default | 6 | 6 | 2 | 21 | 5 |

*FIG. 22*

Example SOA System Statistics:
Wire Statistics

| D | P | C | Wire ID | Source Component | Dest Component | Comm Type | Is Callback | Cum Count | Snapshot Count | TPS | Latency |
|---|---|---|---------|------------------|----------------|-----------|-------------|-----------|----------------|-----|---------|
|   |   |   | WIRE_URI_1 | We Service Binding | | | No | 2000 | 30 | 3 | |
|   |   |   | WIRE_URI_2 | We Service Binding | | | Yes | 2000 | 30 | 2 | |

*FIG. 23*

Example SOA System Statistics:
Queue Backlog Data (Part 1 of Table)

| Queue Name | domain | Queue Type | Ext Cum Added | Ext Cum Removed | SOA Cum Added | SOA Cum Removed | Cum Closed | SOA Cum Faulted |
|---|---|---|---|---|---|---|---|---|
| composite | default | Service | 97 | NA | NA | NA | 97 | 0 |
| jmsin_ProjectC | default | Reference | NA | 97 | 97 | 92 | 92 | 0 |
| jmsout_ProjectC | | | | | | | | |

(Part 2 of Table)

| | | | | | | CUM | |
|---|---|---|---|---|---|---|---|
| Ext Added | Ext Removed | Added | Removed | SOA Closed | SOA Faulted | Active | Backlog |
| 56 | NA | NA | NA | 56 | 0 | | |
| NA | 0 | 56 | 56 | 55 | 0 | | |

FIG. 24

Example SOA System Statistics:
BPEL Engine Internal Queue Data (Part 1 of Table)

| BPEL Engine Internal Queue | | | | CUMULATIVE | | |
|---|---|---|---|---|---|---|
| Process Name | composite | domain | Queue Type | SOA Cum Added | SOA Cum Removed | SOA Cum Closed | SOA Cum Faulted |
| BPELProcess1 | Projects | default | Internal | 97 | 97 | 92 | 0 |

(Part 2 of Table)

| SNAPSHOT | | | | CUM | | |
|---|---|---|---|---|---|---|
| SOA Added | SOA Removed | SOA Closed | SOA Faulted | Active | Backlog |
| 56 | 56 | 53 | 0 | | |

*FIG. 25*

Example SOA System Statistics:
Business Process Activity Statistics

| D | P | Composite | Component | Activity | Line No | Min | Max | Avg |
|---|---|---|---|---|---|---|---|---|
| | | Composite 1 | BPEL 2 | Assign1 | 20 | 5 | 7 | 6 |
| | | Composite 1 | BPEL 2 | Transform1 | 40 | 800 | 900 | |
| | | Composite 1 | BPEL 2 | Invoke1 | 60 | 50 | 1000 | 75 |

*FIG. 26*

| EDN Overall | | | | |
|---|---|---|---|---|
| | | | Backlog | Active |
| | | | 470 | 15 |

| EDN Backlogs | | | | |
|---|---|---|---|---|
| Domain | Composite | Partition | | |
| Domain 1 | Composite 1 | Partition 1 | | |

Top EDN Eventtye Backlog

| Eventtype | Domain | Partition | Composite | Count |
|---|---|---|---|---|
| Event 1 | Domain 1 | Partition 1 | Composite 1 | 1000 |
| Event 2 | Domain 1 | Partition 1 | Composite 2 | 10 |

PERFORMANCE ANALYSIS AND BOTTLENECK DETECTION IN SERVICE-ORIENTED APPLICATIONS

CROSS-REFERENCE TO RELATED APPLICATIONS

The present application is a non-provisional of and claims priority to U.S. Provisional Patent Application No. 62/094,909, filed Dec. 19, 2014, entitled "PERFORMANCE ANALYSIS AND BOTTLENECK DETECTION IN SERVICE-ORIENTED APPLICATIONS," the entire contents of which are incorporated herein by reference for all purposes.

FIELD

Embodiments of the invention relate to the field of computing systems, and more specifically, to comparative performance analysis and bottleneck detection in service-oriented applications.

BACKGROUND

The term Service-Oriented Architecture (SOA) generally refers to a recent software strategy that discrete functions from enterprise applications into interoperable, standards-based services, which can then be combined with other services and reused to meet particular business needs. Thus, using SOA, functionality provided by applications (from potentially multiple vendors) can be "exposed" as one or more services, and then "orchestrated" (e.g., using orchestration capabilities like Business Process Execution Language (BPEL)) into new composite applications. These composite applications can be developed to support an organization's business processes.

Service Component Architecture (SCA) is a software technology created by major software vendors, including IBM, Oracle, and TIBCO. SCA describes a model for building applications and systems using SOA principles, and further builds on open standards, such as Web services, to extend and complement existing SOA approaches.

A basic aspect of SCA is a composite, which is a unit of deployment and includes services that can be accessed remotely. A composite is made up of one or more components, which may each be directed to performing a particular task. Components offer their function as services, which can either be used by other components within the same module or which can be made available for use outside the module through entry points. Components may also depend on services provided by other components—either local or remote—and are commonly called references. References can either be linked to services provided by other components in the same composite, or references can be linked to services provided outside the composite, which potentially can be provided by other composite. Also included within a composite are linkages between references and services, which are referred to as wires.

Over time, software complexity continues to rise and thus, SOA applications similarly increase in complexity. For example, an application may include many composites interacting with each other and other external systems, and each composite may include multiple components. With this increased complexity, then, it becomes tremendously difficult to manage these applications. For example, when the performance of the application is negatively impacted, it can be tremendously difficult to identify which, if any, of the portions of a large SOA application are responsible for the performance degradation, and moreover, why those portions are not being performant.

Accordingly, there is a need for easier maintenance, fault detection, and troubleshooting of complex SOA applications.

BRIEF SUMMARY

The present disclosure relates generally to diagnosing performance and scalability issues in SOA systems. In some embodiments, key statistics related to key points in a SOA system, for key activities during processing of transactions in the SOA system, are collected and aggregated. In some embodiments, such statistics are stored in a persistence store to allow for system performance analysis to be carried out for any arbitrary historic time interval(s).

In some embodiments, operational statistics for a SOA system are received at a central performance tracking module. The operational statistics may include data for parts of an entire SOA system—message flow rates and latency at key points in the system during a time interval, and execution times for key activities in the system during the time interval. Statistics generated for the time interval, in some embodiments, are added to corresponding cumulative statistics. As a time interval expires, a snapshot (i.e., a set of statistics associated with a time period) may be generated—which may include one or both of time period-specific and cumulative statistics—and persisted (e.g., saved in a database). A new time period may then begin and the process repeats with additional statistics for that time period being generated anew. In some embodiments, the generated snapshots are kept indefinitely, but in some embodiments the snapshots are maintained according to a configured or configurable retention time period (e.g., one day, week, month, year, etc.)

In some embodiments, data from one or more snapshots may be used to construct a report to be presented to a user (e.g., an administrator) via a user interface displayed on a display device. The report may include data from a most recent snapshot or a different snapshot (e.g., one selected by the user, an "atypical" snapshot having atypical statistics, etc.). The report may include (or be based upon) data from multiple snapshots. For example, a user may be interested in viewing data from a range of times that encompasses multiple snapshots, for example, if the desired time range is greater than a snapshot time interval.

In some embodiments, the snapshot data may be used in real-time (e.g., by a performance monitor module) to automatically identify a performance-related event/problem in a SOA application (e.g., a sudden decline in throughput) and automatically localize the part of the SOA system that is likely causing the event/problem. In some embodiments, upon identifying such an event and possibly the likely root cause of the problem, the system may be configured to automatically notify a user with this information via a display message presented on a display device, via a transmitted message (e.g., an email, text message, SMS message, etc). The system may cause these notifications to be presented to users of the organization providing the SOA architecture (i.e., "internal" users) and/or to external users of the SOA system (i.e., "external" users).

In some embodiments, the system may be configured to attempt to automatically remedy a performance problem by implementing one or more various remediation techniques, for example, transmitting commands to particular composites/components/etc. to alter their performance, transmitting commands to cause the SOA system to change its allocation of resources (e.g., increase an execution priority of a particular process, allocate additional memory to a particular component), etc.

The foregoing, together with other features and embodiments will become more apparent upon referring to the following specification, claims, and accompanying drawings.

BRIEF DESCRIPTION OF THE DRAWINGS

FIG. 8 illustrates various transaction statistics and transaction breakdown statistics corresponding to the exemplary flow of FIG. 7, according to certain embodiments of the present invention.

FIGS. 11-17 are tables including various views and collections of SOA system statistics that may be generated, retrieved, and analyzed in various embodiments of the present invention.

Figure 28:
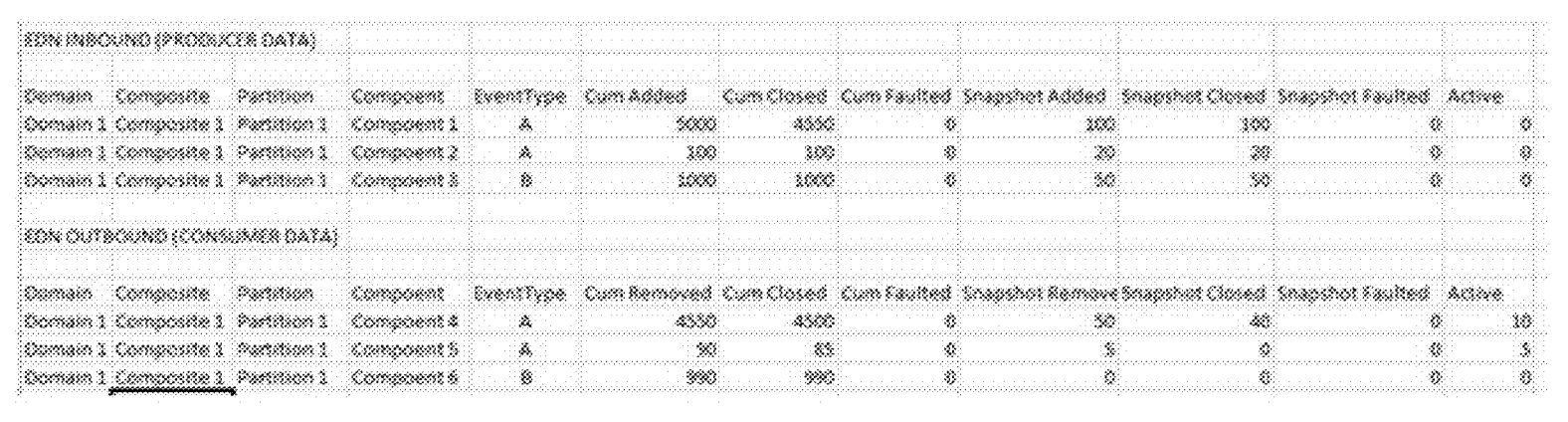

FIGS. 19-28 are tables including various views and collections of SOA system statistics that may be generated, retrieved, and analyzed in various embodiments of the present invention.

DETAILED DESCRIPTION

Figure 1:
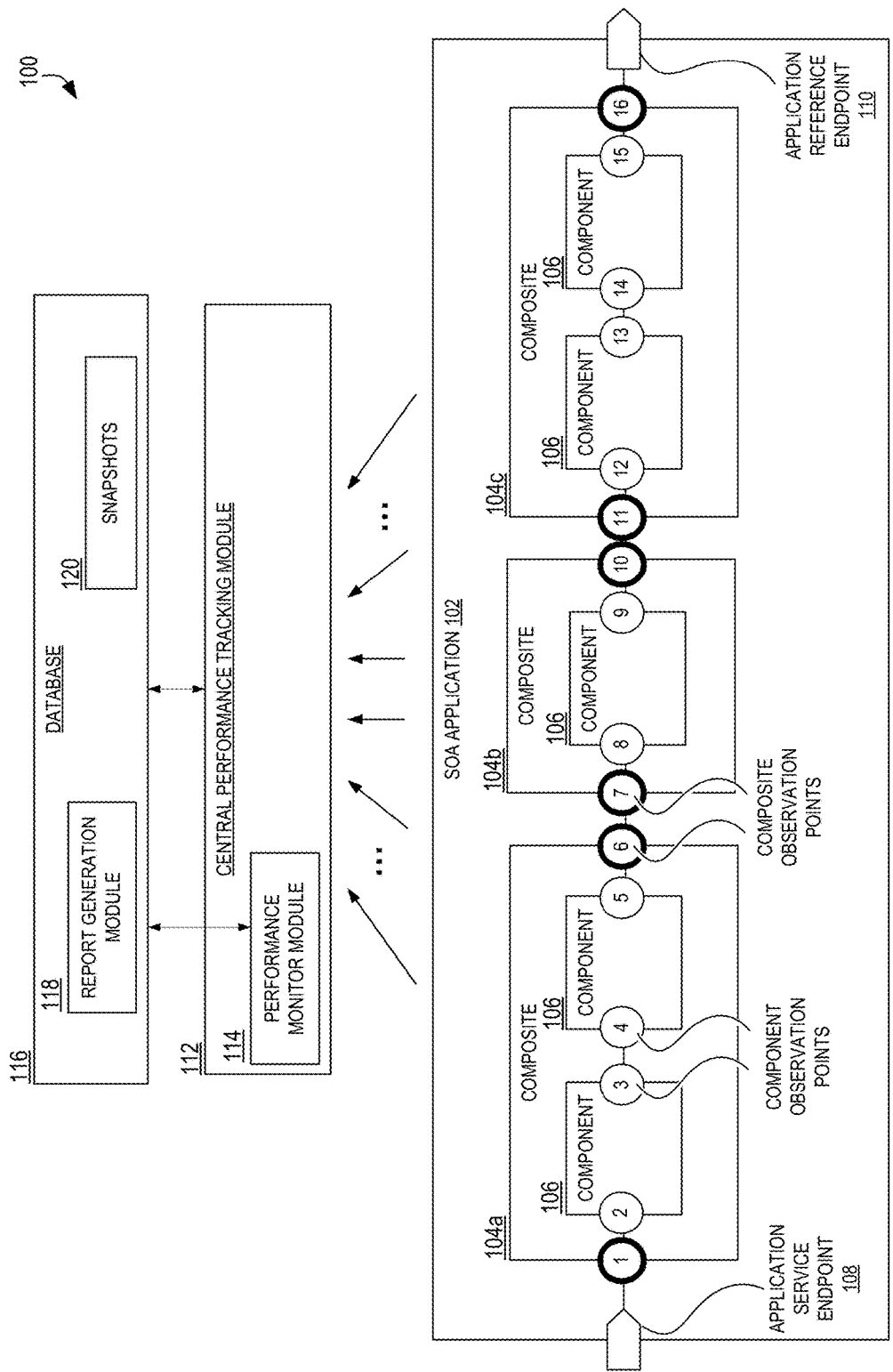
FIG. 1 illustrates a simplified high-level block diagram and functional overview of a SOA system, including a central performance tracking module for executing performance analysis and bottleneck detection in service-oriented applications of SOA systems, according to one or more embodiments of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Diagnosing performance and scalability issues in SOA applications may be difficult, as the ultimate performance of a SOA system may be dependent on a number of factors. SOA systems pose particular challenges since large installations often involve interactions between partners and services (both internal and external), stateful and stateless components, synchronous and asynchronous communications, and/or deployment over multi-domain clusters, etc.

There are many different potential causes for performance/scalability issues in SOA applications. For example, a SOA system may suffer due to a persistent or temporary lack of computing resources, such as the available amount of processor (CPU), memory, or network bandwidth. Additionally, a SOA system may encounter performance issues due to improper configurations (e.g., thread pools, data sources, etc.), slow partners, slow back-end databases, slow middleware/application server/deployment server applications, issues with virtual machines such as available memory heap sizes, etc.

As a result, a SOA system suffering from some of these problems will lead to lower overall throughput of the system (i.e., fewer "transactions" or requests are able to be processed), large increases in response time, large backups in global queues, non-responsive or seemingly non-responsive performance, and possibly random errors or non-deterministic behavior (e.g., in extreme low memory situations).

The present disclosure relates generally to diagnosing performance and scalability issues in SOA systems. In some embodiments, key statistics related to key points in a SOA system for key activities during processing of transactions in the SOA system are periodically collected and aggregated. In some embodiments, such statistics are stored in a persistence store to allow for powerful analysis to be carried out for any arbitrary historic time interval(s). As a result, it might not be necessary to reproduce a potential performance issue (which may no longer exist in the system) to enable analysis.

In some embodiments, operational statistics for a SOA system may be received at a central performance tracking module, or "CPTM." The operational statistics may include data for parts of an entire SOA system—message flow rates and latency at key points in the system during a time interval, and execution times for key activities in the system during the time interval. Statistics generated for the time interval, in some embodiments, may be added to corresponding cumulative statistics. As a time interval expires, a snapshot (i.e., a set of statistics associated with a time period) may be generated—which may include one or both of time period-specific and cumulative statistics—and persisted (e.g., saved in a database). A new time period may then begin and the process repeats with additional statistics for that time period being generated anew. In some embodiments, the generated snapshots may be kept indefinitely; but in certain embodiments the snapshots are maintained according to a configured or configurable retention time period (e.g., one day, week, month, year, etc.).

In some embodiments, data from one or more snapshots may be used to construct a report to be presented to a user (e.g., an administrator) via a user interface displayed on a display device. The report may include data from a most recent snapshot or a different snapshot (e.g., one selected by the user, an "atypical" snapshot having atypical statistics, etc.). The report may include (and/or may be based upon) data from multiple snapshots. For example, a user may be interested in viewing data from a range of times that encompasses multiple snapshots (i.e., the desired time range is greater than a snapshot time interval).

In some embodiments, only a subset of the report may be displayed at any one time via the user interface, and the user may navigate through to other portions of the report using, for example, user interface input elements such as scrollbars, icons, selectable/clickable display elements (e.g., text, graphics, etc.), etc.

In some embodiments, certain statistics that are atypical or otherwise statistically significant are visually modified (e.g., using color, highlighting, font weights, icons/graphics, etc.) in the user interface to call the user's attention to these statistics. For example, in some embodiments, an atypically high latency time for a component (measured in a variety of ways—such as in comparison to one or more other corresponding latency times of the same component from other snapshots, or in comparison to other latency times of other components, etc.) may be reported as text with a highlighted background.

Using this report user interface, embodiments of the invention allow for custom-statistics to be generated "on the fly" (i.e., on demand) for user-specified (or otherwise "custom") time periods. As one example, in embodiments where each snapshot includes cumulative statistical data (e.g., a cumulative number of requests processed by a component, which includes activity before the particular snapshot back until an origination time), custom statistical data may be generated based upon a snapshot at the beginning of the desired time period and another snapshot at the end of the desired time period. For example, a "custom" report may be generated for a desired time period including a "custom" number of processed requests based upon subtracting the cumulative number of requests processed from the beginning snapshot from the cumulative number of requests processed by the component from the ending snapshot.

In some embodiments, the snapshot data may be used in real-time (e.g., by a performance monitor module) to automatically identify a performance-related event/problem in a SOA application (e.g., a sudden decline in throughput) and to automatically localize the part of the SOA system that is likely causing the event/problem. In some embodiments, upon identifying such an event and possibly the likely root cause of the problem, the system may be configured to automatically notify a user with this information via a display message presented on a display device, via a transmitted message (e.g., an email, text message, SMS message, or the like), etc. The system may cause these notifications to be presented to users of the organization providing the SOA architecture (i.e., "internal" users) and/or to external users of the SOA system (i.e., "external" users).

In some embodiments, the system may be configured to attempt to automatically remedy a performance problem by implementing a remediation technique including, but not limited to, transmitting commands to particular composites, components, subcomponents, etc., to alter their performance, transmitting commands to cause the SOA system to change its allocation of resources (e.g., increase an execution priority of a particular process, allocate additional memory to a particular component, etc.)

As an additional example, in some embodiments a user may configure a rule (e.g., a set of one or more conditions involving the statistics and possibly associated composites/components/subcomponents/queues/etc.) and a set of actions to be performed (e.g., a set of shell commands) when the rule is triggered.

Accordingly, some embodiments provide certain advantages and benefits with respect to quickly and easily identifying bottlenecks and/or backups in the system. Further, some embodiments are especially useful for tuning a SOA system for scaling or performance improvement, as the results are easily and quickly available, and the impact of a change in one portion of the SOA system (e.g., a change to a first composite) to another portion of the SOA system (e.g., a different composite) may be easily seen. Certain embodiments allow for a centralized point of data collection, as opposed to other systems that may require the use of different monitoring and management tools that may be specific to separate composites, components, subcomponents, etc. Such embodiments also may involve very small resource overhead (e.g., memory, processor, network) for the statistical data gathering, as only small fragments of simple data may be reported back to the central location. Accordingly, embodiments allow for this statistical data gathering to easily be run in production environments due to their light requirements for system resources. Moreover, in embodiments persisting the statistical snapshot data for many periods, rich historical analysis/benchmarking/baseline computation may be straightforwardly generated and flexible snapshot comparison may similarly be performed.

Referring now to FIG. 1, a simplified high-level block diagram and functional overview are shown, illustrating an SOA system 100 including a central performance tracking module for executing various performance analyses and bottleneck detection in service-oriented applications according to certain embodiments. It should be understood that the embodiment depicted in FIG. 1 is merely one example and is not intended to unduly limit the claimed embodiments of the present invention. One of ordinary skill in the art would recognize many possible variations, alternatives, and modifications to this illustrated system 100. For example, there may be more or fewer applications 102, composites 104, components 106, application service/reference endpoints, composite/component observation points, etc.

In this embodiment, a SOA application 102 is depicted as including an application service endpoint 108 representing a processing point where requests are received from client devices, a first composite 104a including two components 106, a second composite 104b including one component 106, a third composite 104c including two components 106, and an application reference endpoint 110 from where response messages may be transmitted back to requesting client devices or other devices or modules. Each of the composites 104 and/or components 106 may be standalone modules—possibly from different developers/originators—and/or may execute on one computing device or across many computing devices, which may be in a same geographic location or separated in one or more different geographic locations (e.g., data centers, buildings, cities, states, countries, etc.). Although not depicted herein, the SOA application 102 may include bindings (also referred to herein as "adapters") that may serve as a points of connection between components of the SOA application 102 and various external systems. In some embodiments, a binding may operate to receive an inbound request received according to a particular protocol/format and translate the request into a different format (e.g., a standardized or normalized format) utilized internally by components of the SOA application 102. Similarly, a binding may operate to take messages of the SOA application 102 format and translate them into other protocols/formats for communication with other systems. As an example, a Java Message Service (JMS) adapter may receive messages from internal SOA components and translate them into JMS-formatted messages to thereby allow components to communicate with external systems that only understand JMS messages. Such abstraction may allow components to interact with external systems that utilize different message protocols without requiring the components to perform any necessary work for constructing messages in any required formats.

In some embodiments, each of the components has one or more associated input and/or output queues for storing requests (also referred to as "messages"). As a request is received at the application service endpoint, the request may be placed in a first input queue that is serviced by the first component of the first composite. When the first component is able to process another request (or detects the existence of the request within the queue), the component removes the request from the queue, processes it, and then places the (likely transformed) request into an "output" queue for that first component. This "output" queue may simultaneously serve as an "input" queue for the second component of the first composite, although in some embodiments the queues may be distinct. Of course, depending upon the configuration of the system, queues may be utilized at one or more of composite boundaries, component boundaries, subcomponent boundaries, at service/reference endpoints.

As a request is processed by the SOA application, the request (in possibly radically different forms) will flow through these three composites (per configuration) and will thus, at various points in time, "exist" at each of the points represented by circles 1-16. In various embodiments, when a request reaches one of these "observation points," a software or hardware module (of the SOA system 100) may be configured to send a message to the central performance tracking module (CPTM) 112 to report the occurrence of the request passing through that point. This message may be sent using various well-known techniques including IPC techniques, function calls, network messages, etc. This message may, in some embodiments, identify the particular location (i.e., the sending location) associated with the message.

The CPTM 112 then, based upon a plurality of such report messages, may determine a variety of statistical measures associated with the various locations, composites, components, etc. For example, in some embodiments, upon receipt of a report message during a snapshot period, the CPTM 112 may be configured to increment a snapshot-specific report counter tracking a number of report messages (of a particular type) received since the beginning of a snapshot time period, or by incrementing an aggregated report counter tracking a number of report messages received since a defined earlier time (e.g., a server start, or beginning of day, etc.). As another example, the CPTM 112 may be configured, at the end of each snapshot period, to determine an average latency for all messages to be processed by a component during the snapshot period. As yet another example, the CPTM 112 in some embodiments may maintain snapshot-specific statistical measures and also generate aggregated statistics that are based upon data from one or more previous snapshots. For example, if the CPTM 112 determines that 1000 requests were observed at the composite observation point #1 (e.g., circle '1' in FIG. 1), the CPTM 112 may determine an aggregate number of requests for a range of time (e.g., in the last 24 hours, in the last week, since the beginning of the day, etc.), based upon an aggregate amount of requests from a previous snapshot. Accordingly, the CPTM 112 may generate a wide variety of statistical measures for SOA applications 102, some of which are described later herein with respect to other figures.

At this point, the CPTM 112 may store a snapshot (including the determined statistical measures) in a database 116, which may be located at a same computing device or a different computing device.

The depicted SOA system 100 of the embodiment of FIG. 1 also includes a performance monitor module 114 and a report generation module 118. In some embodiments, these modules may be implemented as software modules that are executable by one or more processors of a computing device, and these modules may be on a same computing device (or set of computing devices) that implement the CPTM 112 and/or database 116 and/or one or more composites 106 of the SOA application 102 (e.g., application servers).

The report generation module 118 is configured to access the snapshots 120 stored by the database 116 and generate reports based upon the snapshot data. The reports may be provided to users via a web browser (e.g., as HTML, JavaScript, JSON, XML, etc.), via a different type of application (e.g., a special-purpose SOA management application), as a plaintext file or formatted file (e.g., a CSV file or a spreadsheet, PDF, Word document), sent within or as an attachment to an email or other electronic message, etc. In some embodiments, the report generation module 118 may further construct an interactive user interface (e.g., including user interface input elements) to allow a user to navigate through the data of a particular snapshot for the entire SOA application 102 and/or portions of the application such as individual composites 104 and/or components 106, the data of other snapshots, create custom reports based upon one or more snapshots at various levels of granularity, and/or perform or otherwise initiate SOA system remediation measures.

The performance monitor module 114 may be configured to interact with the CPTM 112 to view "live" reported data and/or with the database to view recent (or historic) snapshot data to enable the detection of performance issues or bottlenecks in the SOA application 102. If and when a performance issue or bottleneck is detected (according to procedures described elsewhere herein), the performance monitor module 114 may generate an alert and/or notify users of the issue, and/or attempt to initiate a remediation of the issue as described elsewhere herein.

In various embodiments, the entities depicted in FIG. 1 (and other entities, such as client devices not depicted here) may be implemented by computing devices of various types including, but not limited to, personal computers (PCs), desktops, mobile or handheld devices such as laptops, mobile phones, tablets, etc., and other types of devices. Some or all of the entities depicted herein may utilize one or more communication networks to facilitate communications. The one or more communication networks can include networks of various types, each possibly including one or more networking devices or equipment including but not limited to network switches, routers, bridges, load balancers, etc. Examples of one or more communication networks include, without restriction, the Internet, a wide area network (WAN), a local area network (LAN), an Ethernet network, a public or private network, a wired network, a wireless network, a virtual network, etc., and combinations thereof. Different communication protocols may be used to facilitate the communications through the one or more communication networks including both wired and wireless protocols such as the IEEE (Institute of Electrical and Electronics Engineers) 802 suite of protocols, Internet Protocol (IP), TCP/IP (Transmission Control Protocol/Internet Protocol), Asynchronous Transport Mode (ATM), frame relay network protocols, Multi-Protocol Label Switching (MPLS), OpenFlow, IPX (Internetwork Packet Exchange), SAN (Storage Area Network) protocols, APPLETALK™, BLUETOOTH™, Long-Term Evolution (LTE), and other protocols.

Figure 2:
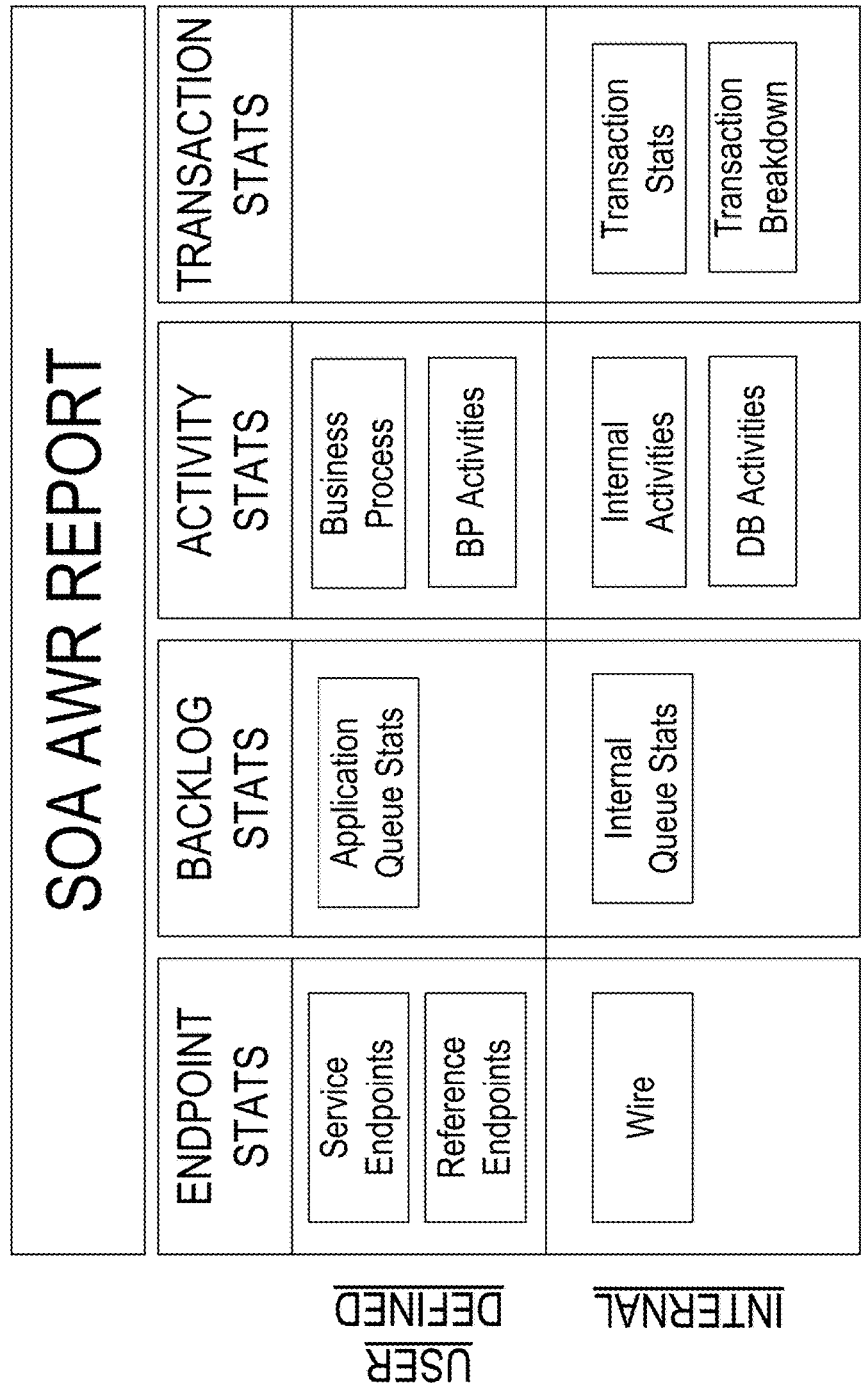
FIG. 2 illustrates various types of SOA system statistics collected by a central performance tracking module according to various embodiments of the present invention.

Referring now to FIG. 2, an example diagram is shown illustrating various types of SOA system statistics that may be collected by a central performance tracking module 112 according to some embodiments of the present invention. In this example, four high-level types of statistics may be generated for a snapshot by the CPTM 112, and presented in a report 200 (herein represented by the term "SOA AWR Report"). Further examples of many of these types of statistics will be presented with regard to the following figures.

A first type of statistic includes "endpoint stats," which may include Composite Inbound Stats and/or Composite Endpoint Stats. Endpoint stats may be thought of as providing data regarding the flow of messages as seen at the fringes of a composite. In some embodiments, the inbound stats for a composite on inbound side may include the processing rate and response time as seen by a caller of the composite, which may be another composite or an external or target system. Similarly, the outbound stats for a composite may include information about the processing rate and the response time of a target system as seen by the composite. These stats may referred to as "Inbound Stats" and "Outbound Stats" and may be respectively measured at service endpoints and reference endpoints for a composite.

In some embodiments, similar processing rate and/or response time data may be captured for the "wires" within a composite to provide similar analysis for components inside a composite.

In some embodiments, the endpoint stats may include a "Cumulative Count" value indicating an aggregated number of requests seen at that point (e.g., 1000 requests since midnight), a "Snapshot Count" value indicating a number of requests seen at that point during the current snapshot time interval (e.g., 50 requests during the interval), a "Snapshot TPS" value indicating a number of transactions per second processed at that point, and/or a "Snapshot latency" value, which may indicate a round-trip time taken by a thread to return, regardless of how far the thread goes.

A second type of statistic is "Activity Stats." An incoming request flowing through a SOA system passes through various layers/modules and may undergo normalization/denormalization and transformations, etc. A request may pass through various business processes (routines or functions, for example) and activities within each of those. The request may even be stored in database (e.g., could be "dehydrated" and persisted to storage while waiting for another system to provide some input) or get transformed or aggregated during its journey through the SOA application. "Activity stats" provide information about execution time taken at various SOA layers while handling the request. When presented in report form, this data may be made available in multiple tables with varying level of granularity, namely Business Process Instance Stats, Business Process Activity Stats, Binding Stats & Key Internal Activity Stats, etc.

In some embodiments, the activity stats may include a "Cumulative Count" value indicating an aggregated number of requests serviced by the entity (e.g., 1000 requests since midnight), a Snapshot Start Count value, a Snapshot Completed Count, a Snapshot Average Execution Time, a Snapshot Total Active Time, and/or a Snapshot Total Dehydrated Time.

A third type of statistic in this example is "Backlog Stats," which may describe the backlog (i.e., number of requests waiting in queues to be processed) for various entities in the SOA application. The backlog stats may, in some embodiments, be captured for each snapshot interval as well as cumulatively (e.g., from a server start, from a defined point in time). Backlog stats may include, for example, an "Added" value of requests added to a queue (for the snapshot and/or cumulatively), a "Removed" value of requests removed from the queue (for the snapshot and/or cumulatively), a "Closed" value of requests that have been closed by a module (for the snapshot and/or cumulatively), a "Faulted" value of requests that encountered a fault in the module (for the snapshot and/or cumulatively), an "Active" value of requests that are actively being processed by a module (at, for example, the end of the snapshot time period), and/or a "Backlog" value indicating a number of requests in the queue (at, for example, the end of the snapshot time period).

A fourth type of statistic in this example is "Transaction Stats," which may indicate a number of active transactions being processed, a number of completed transactions during the time period, etc. Additional detail related to Transaction Stats is presented later herein.

Figure 3:
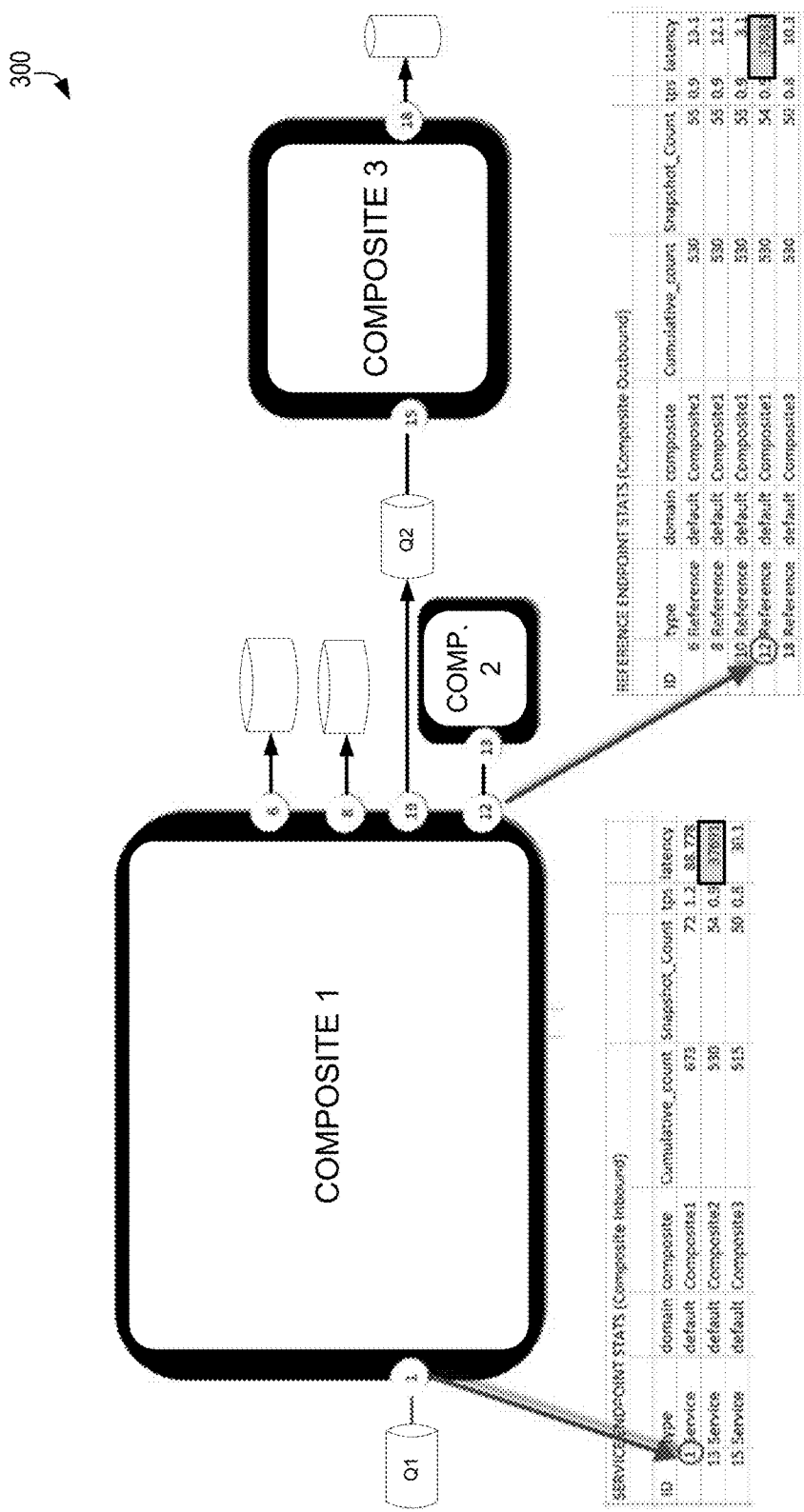
FIG. 3 illustrates an example SOA application, including multiple composites and corresponding service endpoint statistics and reference endpoint statistics that may be generated by a central performance tracking module, according to various embodiments of the present invention.

Referring now to FIG. 3, an illustrative SOA application 300 is shown including multiple composites, along with corresponding service endpoint statistics and reference endpoint statistics generated by a central performance tracking module 112 according to some embodiments of the present invention. The example application 300 includes a flow moving from first queue (Q1) to a first composite, out at circle '6' to a database operation, out at circle '8' to another database operation, out at circle '10' to a second queue (Q2)—to be serviced by a third composite and another database operation, and out at circle '12' to a second composite.

FIG. 3 also shows two tables of a report generated for this SOA application 300 that are directed to service endpoint stats (i.e., circle '1' of composite 1, circle '13' of composite 2, and circle '15' of composite 3) as well as reference endpoint stats (i.e., circle '6' of composite 1, circle '8' of composite 1, circle '10' of composite 1, circle '12' of composite 1, and circle '18' of composite 3).

Each of these tables includes an identifier of the corresponding observation point (i.e., the circles in the figure), a "type" of the observation point (i.e., reference or service), a domain of the SOA application, and a composite identifier associated with the observation point (e.g., Composite1, Composite2, Composite3). Each of these tables also includes a "Cumulative_count" attribute/column (with associated values) for the number of requests that have been seen since a point in time (i.e., a time period longer than one snapshot time interval), a "Snapshot_count" column for the number of requests that have been seen during the current snapshot interval, a "TPS" (transactions per second) value—here calculated as the Snapshot_count divided by the snapshot interval (e.g., 60 seconds), and a "latency" value indicating a time delay at that point.

In this example figure, the latency value for service endpoint ID of 13 (e.g., corresponding to circle '13') is highlighted to indicate that the value is exceptional or atypical. As discussed, a value may be determined to be exceptional, for example, if it is different than the other latencies of other units in the system or if it is significantly larger or smaller (e.g., greater than a threshold difference) than previous latencies observed for the same observation point. Of course, there are many other ways to configure a value as being viewed as exceptional—if it is larger/smaller than a configured threshold, etc. Similarly, the latency value for the endpoint ID of 12 (e.g., corresponding to circle '12') is similarly highlighted as exceptional.

In some embodiments, as discussed later herein, this may indicate that composite 2 is experiencing a performance issue.

Figure 4:
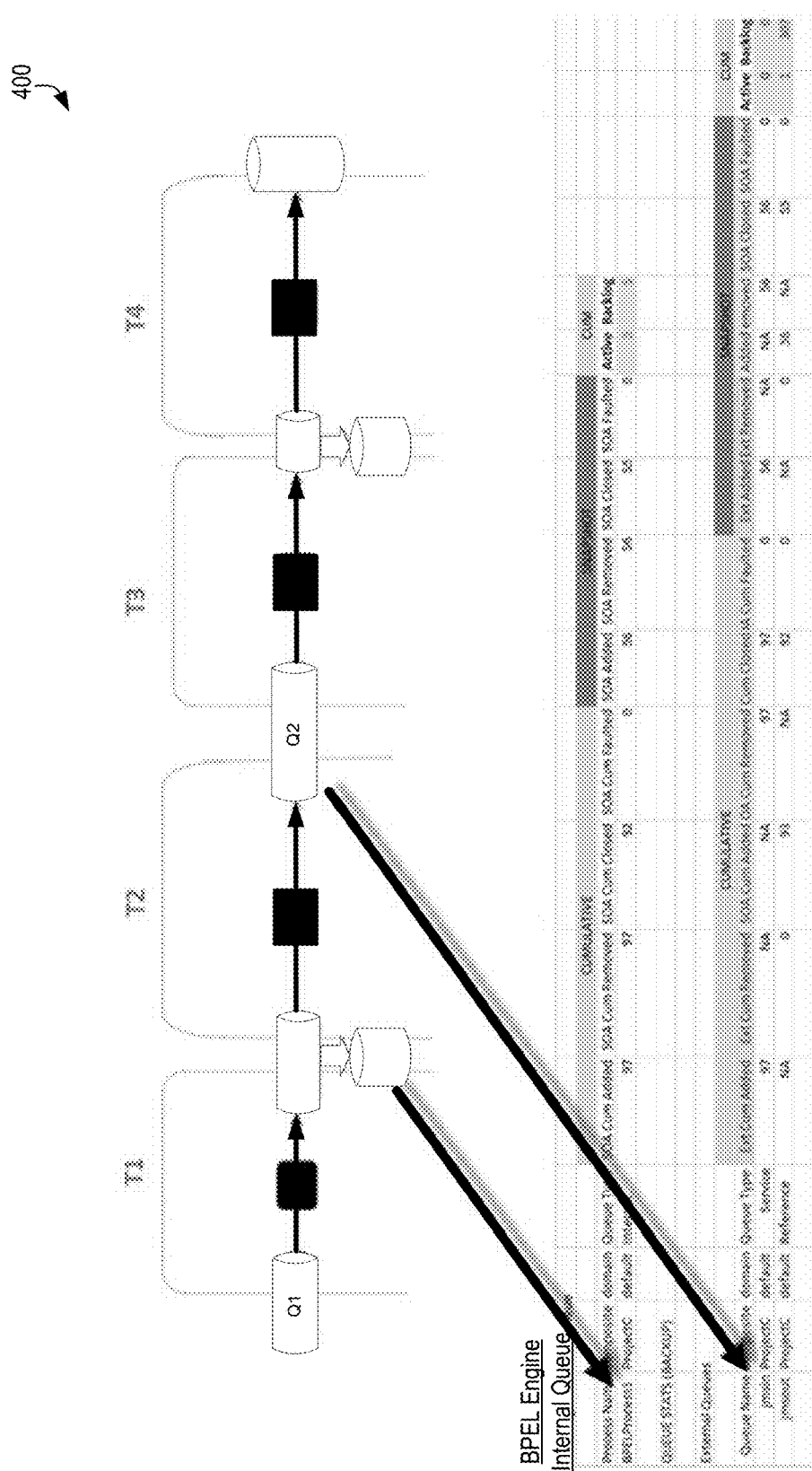
FIG. 4 illustrates an example SOA application and corresponding internal queue statistics and external queue statistics, according to various embodiments of the present invention.

Referring now to FIG. 4, another example SOA application 400 is shown along with corresponding internal queue statistics and external queue statistics, in accordance with various embodiments of the present invention.

In this depicted embodiment, a first table referred to as "BPEL Engine Internal Queue" includes a process name, a composite identifier, a domain, a queue type, a Cumulative Added value, a Cumulated Removed value, a Cumulative Closed value, a Cumulative Faulted value, a snapshot Added value, a snapshot Removed value, a snapshot Closed value, a snapshot Faulted value, and an Active value and Backlog value. These values correspond to queue statistics within the SOA application itself, and thus do not involve external systems. As depicted, this table includes one entry for a queue of a component named "BPELProcess1."

Additionally, this depicted embodiment also includes queue stats for External Queues, which include a Queue Name, a composite identifier, a domain, a queue type, an External Cumulative Added value, an External Cumulative Removed value, a SOA Cumulative Added value, a SOA Cumulative Removed value, a SOA Cumulative Closed value, a SOA Cumulative faulted value, a snapshot External Added value, a snapshot External Removed value, an Added value, a Removed value, a Closed value, a Faulted value, and an Active value and Backlog value. As depicted, this table includes two entries—the first for a service queue named "jmsin" and the second for a reference queue named "jmsout".

Figure 5:
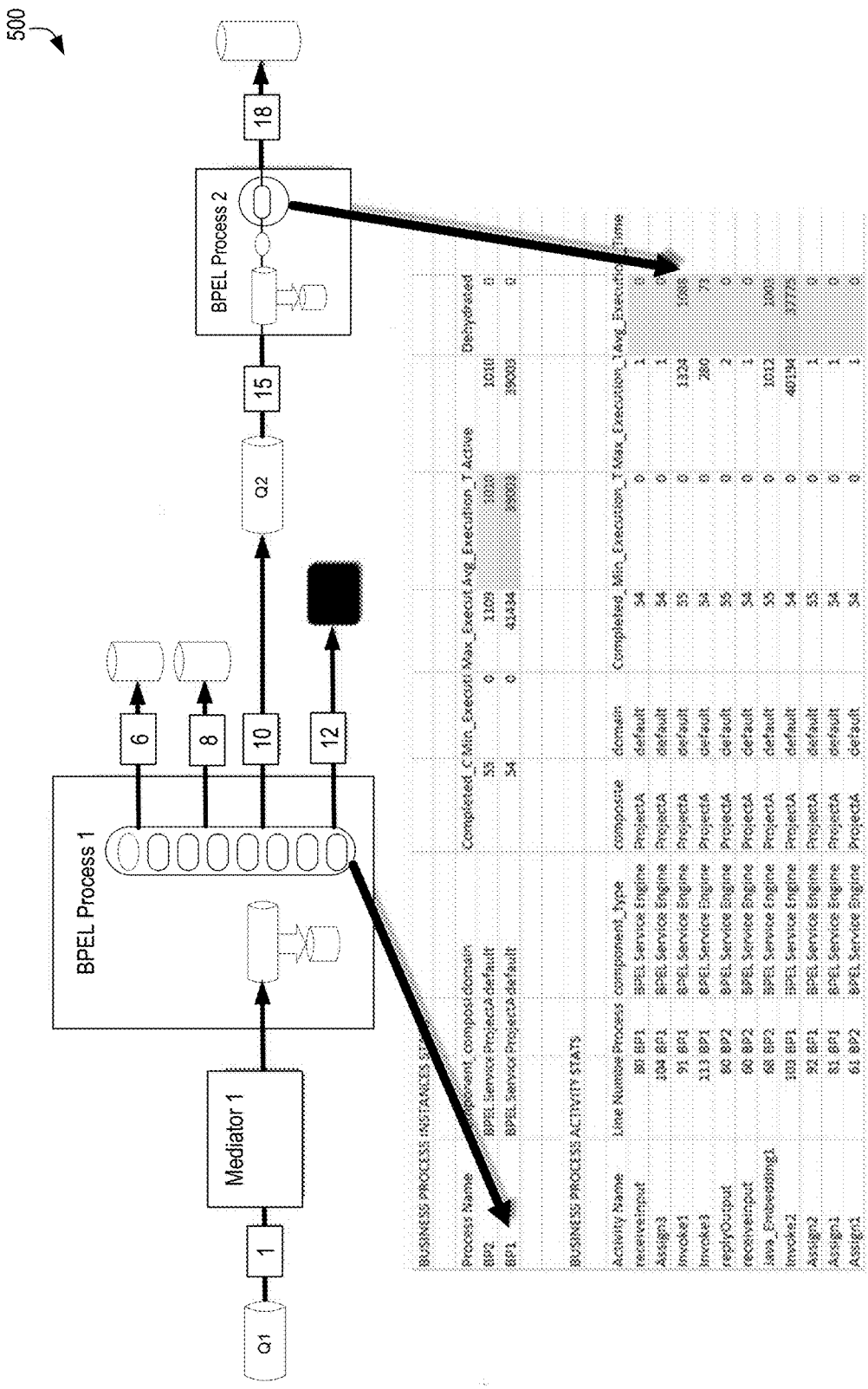
FIG. 5 illustrates an example SOA application and corresponding subcomponent instance statistics and subcomponent activity statistics, according to various embodiments of the present invention.

Referring now to FIG. 5, another example SOA application 500 is shown, along with and corresponding subcomponent instance statistics and subcomponent activity statistics, in accordance with certain embodiments of the present invention.

In this example, the first table of the report is for component instance stats, and includes a "process" (or component) name, a component type identifier, a composite identifier, a domain, a completed_count value of a number of requests completed, a minimum execution time value of a minimum amount of time to complete processing a request, a maximum execution time value of a maximum amount of time to complete processing a request, an average execution time value of the average time required to process the requests, a number of active requests for the subcomponent, and a number of dehydrated requests. In some embodiments, these component instance stats may include a standard deviation value, variance value, or other statistical measure that is associated with the execution time to provide insight into how widely the execution times have varied.

In this depiction, there are two entries in the table for a first component "BP1" (depicted in the figure as including a group of seven rectangles and a circle within the "BPEL Process 1" box), and the "process" name entry of "BP1" includes a highlighted average execution time, which indicates that it is an exceptional value and may be experiencing a performance issue.

The second table is for subcomponent (or Business Process Activity) stats, and includes columns for an activity (or subcomponent) name, line number for a line of the code associated with the subcomponent, a process identifier, a component type identifier, a composite identifier, a domain identifier, a Completed value of the number of requests completed by the subcomponent, a Minimum Execution Time of the minimum amount of type required by the corresponding subcomponent to complete processing any request during the time interval, a maximum Execution Time for the maximum amount of type required by the corresponding subcomponent to complete processing any request during the time interval, and an Average Execution Time of the average amount of type required by the corresponding subcomponent to complete processing any request during the time interval.

The depicted example includes eleven different subcomponents—seven of which for the component "BPEL Process 1" and four of which are for the component "BPEL Process 2". In this example, the average execution time value for the subcomponent (or "activity") named "Invoke 2" is highlighted to indicate its exceptional status, which may indicate that it is suffering from a performance issue.

Thus, from this data presented in these two tables, a performance issue can be (automatically or manually) identified as existing within the component "BPEL Process 1" and localized specific to the "Invoke 2" subcomponent.

Figure 6:
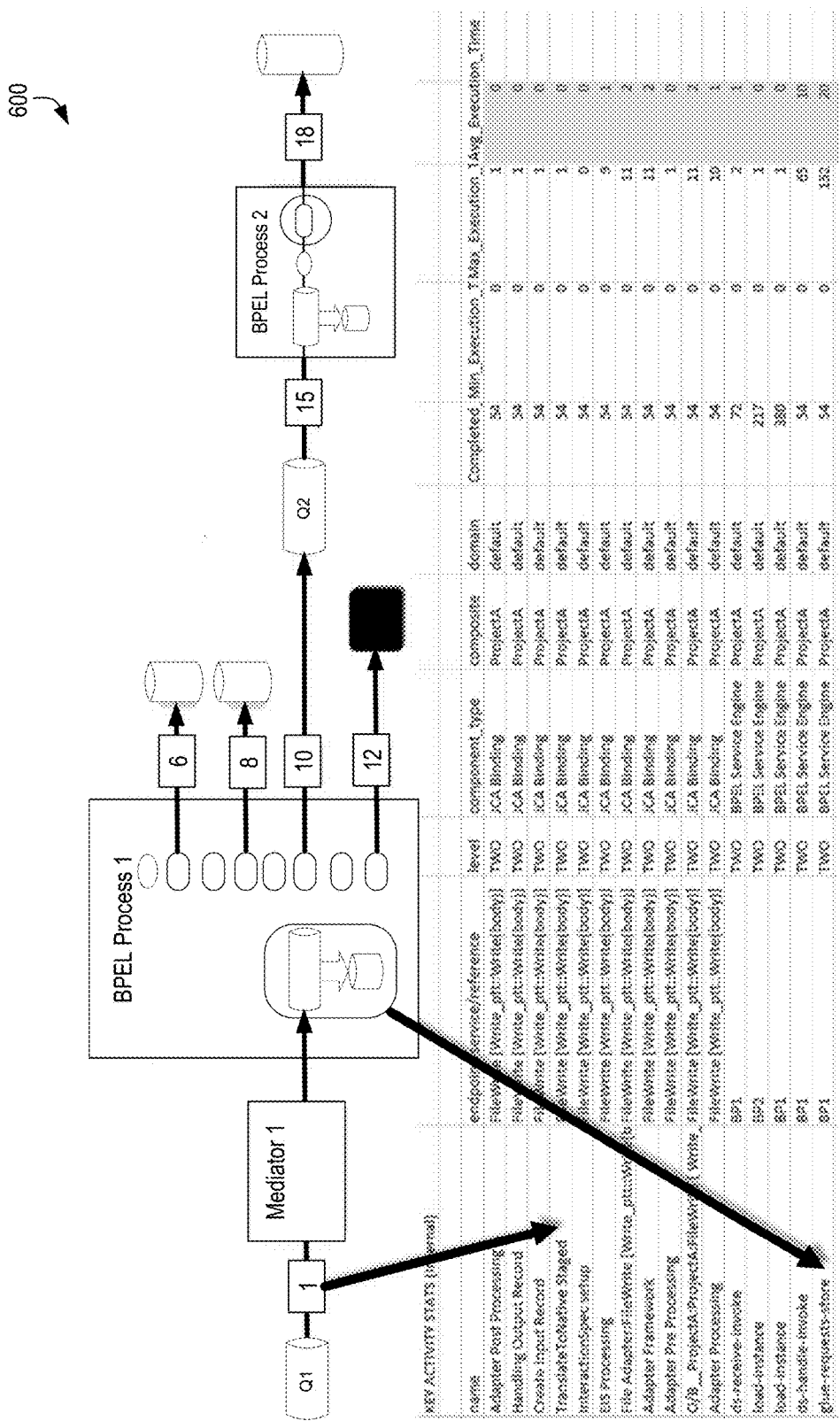
FIG. 6 illustrates an example SOA application and corresponding system-wide activity statistics, according to various embodiments of the present invention.

Referring now to FIG. 6, another example SOA application 600 is shown, along with corresponding system-wide activity statistics, in accordance with certain embodiments of the present invention.

In this depiction, a table shows key activity stats for internal activities. The table includes columns/attributes for an activity name, an endpoint identifier, a level, a component type of the activity, a composite identifier of the associated composite, a domain identifier, and a Completed value for the number of requests completed by the activity/subcomponent, a minimum execution time, a maximum execution time, and an average execution time. The depicted example includes sixteen entries, and each of the average execution times are highlighted in green, which may indicate that the value is not exceptional (e.g., falls within a defined range of values, does not deviate from a historic corresponding value, etc.) Of course, both exceptional (e.g., "red" highlight) and non-exceptional (e.g., "green" highlighting) may be used in any of the tables/reports in the system and in any of these figures.

Figure 7:
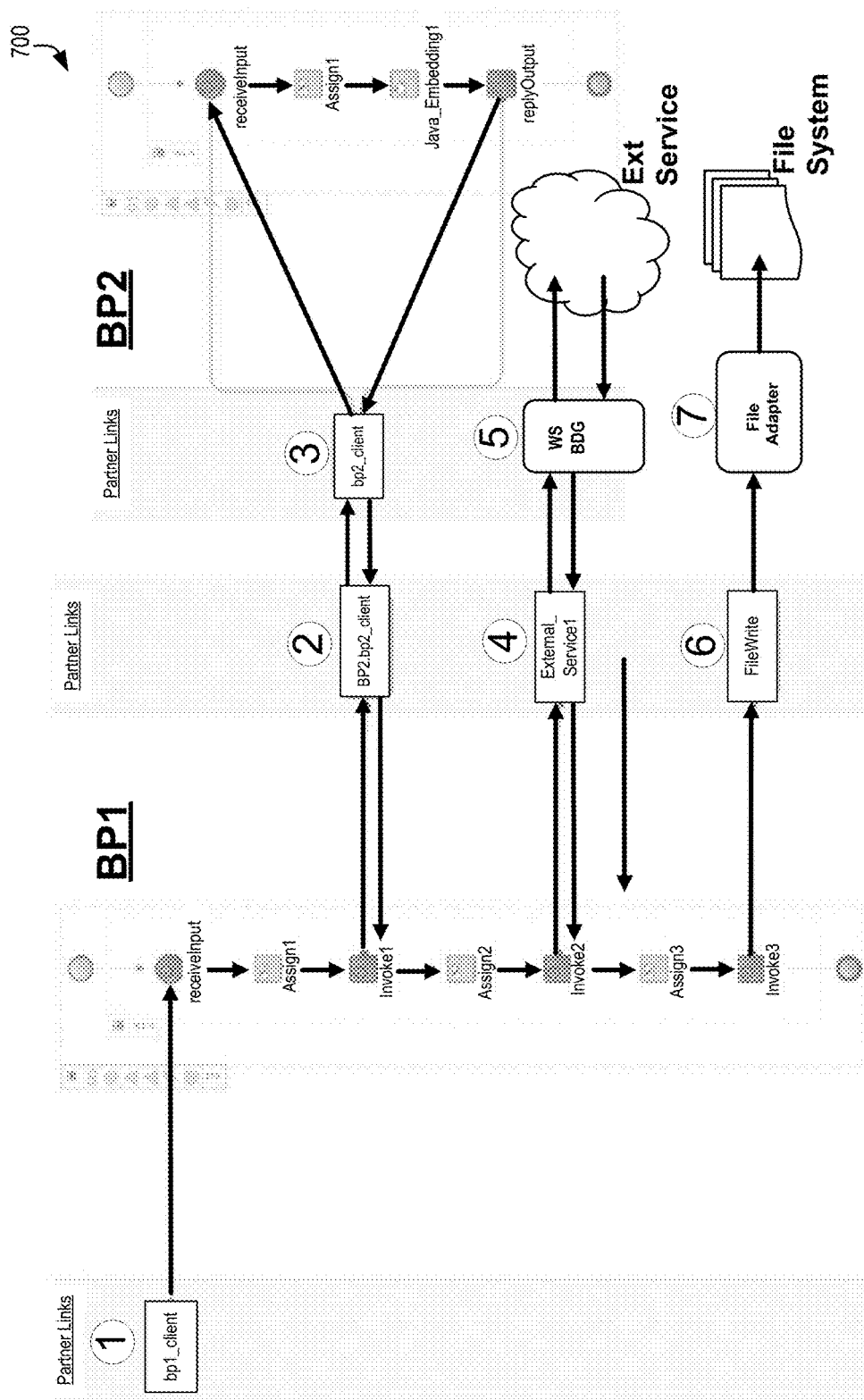
FIG. 7 illustrates an example flow through an exemplary SOA application, according to various embodiments of the present invention.
Figure 8:
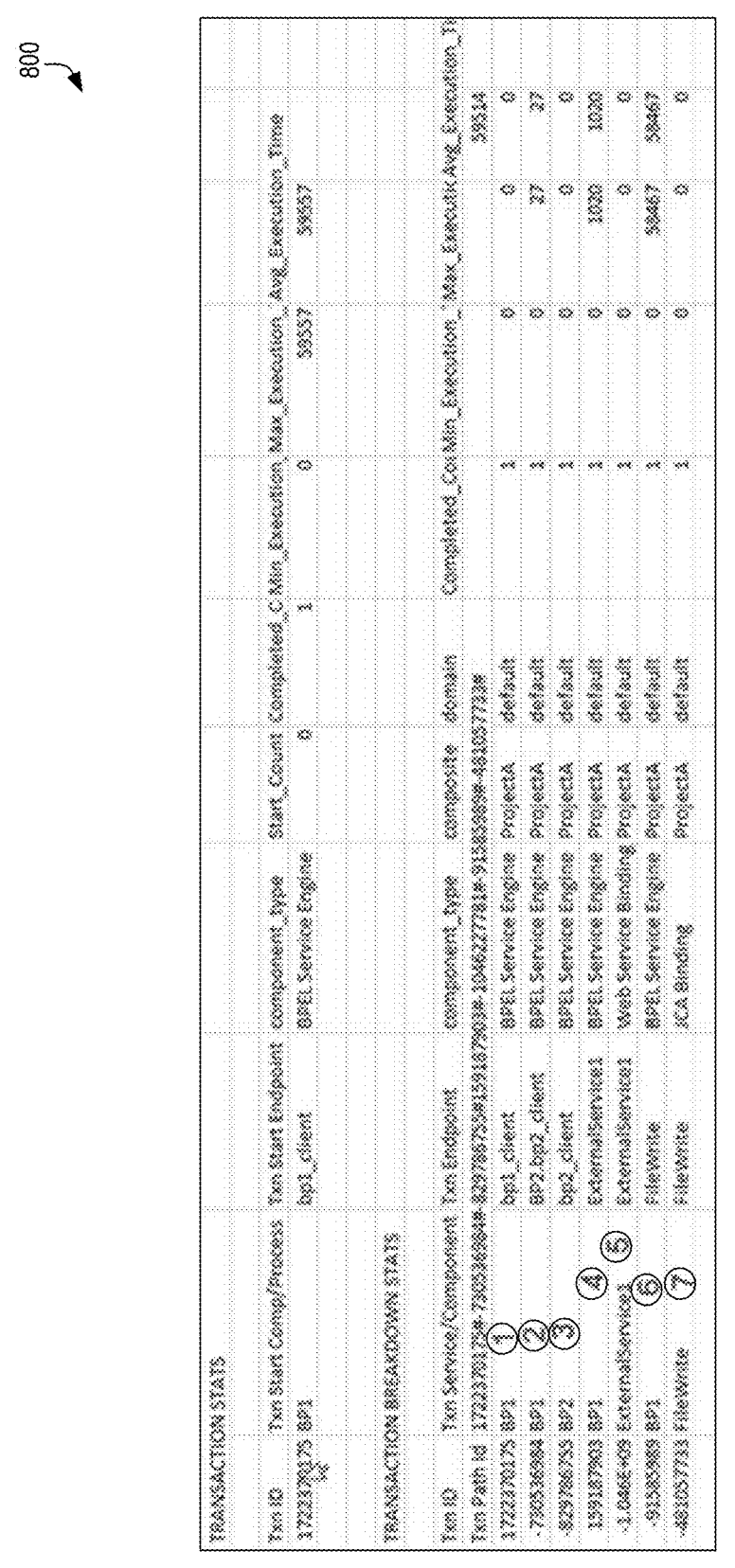

Referring now to FIG. 7, an example diagram is shown of a flow 700 through an example SOA application 700, in accordance with some embodiments of the present invention. At '1', a request is received and processed, and passed to the component BP1, flows through a number of sub-components before being passed (at 2 and 3) to component BP2, flows through a number of sub-components of BP2 before being returned to BP1, flows through two more subcomponents of BP1 and then at 4 and 5 is passed to an external service and returned again from the external service to BP1, where it flows through additional sub-components of BP1 and back at 6 and 7 to a file system. With this system in mind, FIG. 8 illustrates transaction statistics and transaction breakdown statistics 800 corresponding to the example flow of FIG. 7, in accordance with some embodiments of the present invention.

These transaction statistics 800 include a first "TRANSACTION STATS" table, which provides statistics for particular "transactions" (i.e., processing for a particular request) and how they flow through the SOA application 700 of FIG. 7. The table includes a transaction identifier, a transaction starting component/process identifier, a transaction starting endpoint identifier, a component type identifier, a starting count, a completed count, a minimum execution time, a maximum execution time, and an average execution time. In this example, one transaction is included in the table, which was completed (i.e., completed_count is 1), and the execution time was 59557 (e.g., seconds), which for the sake of this example is exceptional.

To determine additional specificity as to why the performance issue is occurring, the second table, entitled "TRANSACTION BREAKDOWN STATS," identifies a number of pieces of information at various points in the SOA application 700. Each entry in the table includes a transaction identifier, a transaction service/endpoint identifier, a transaction endpoint identifier, a component type, a composite identifier, a domain identifier, a completed count identifier, a minimum execution time, a maximum execution time, and an average execution time.

In this example, the first table entry includes an overall execution time through the measured system portion of 59514 units (e.g., seconds). Then, each of the numbered reference points of FIG. 7 (i.e., points 1 to 7) are represented with corresponding table entries, here labeled with numbers 1-7. Here, it can be immediately observed that label number "6" that corresponds to the FileWrite endpoint of component BP1 has a large average execution time of 58467 that makes up a large amount of the overall execution time of 59514, and thus is suffering from a performance issue.

Having presented a few examples of the variety of statistics that can be generated by a SOA system configured with a central performance tracking module to generate statistics based upon key data from key points in the system, the following sections describe various procedures that may be used to determine the existence of performance/bottleneck issues and/or identify likely or actual causes of such issues. In some embodiments, these techniques may be include aggregating data and generating/providing reports to allow for manual determinations of performance/bottleneck issues and/or causes by users such as system administrator. In other embodiments, these techniques may be implemented programmatically, for example, encoded as a set of instructions in an automated or semi-automated system which automatically determines the existence of performance/bottleneck issues and identifies potential causes of such issues.

Illustrative flows are now presented in accord with some embodiments of the invention. The operations of these flows and flow diagrams are described with reference to the exemplary embodiments of the other diagrams. However, it should be understood that the operations of these flow diagrams can be performed by embodiments of the invention other than those discussed with reference to these other diagrams, and the embodiments of the invention discussed with reference these other diagrams can perform operations different than those discussed with reference to the flow diagrams. Though the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Figure 9:
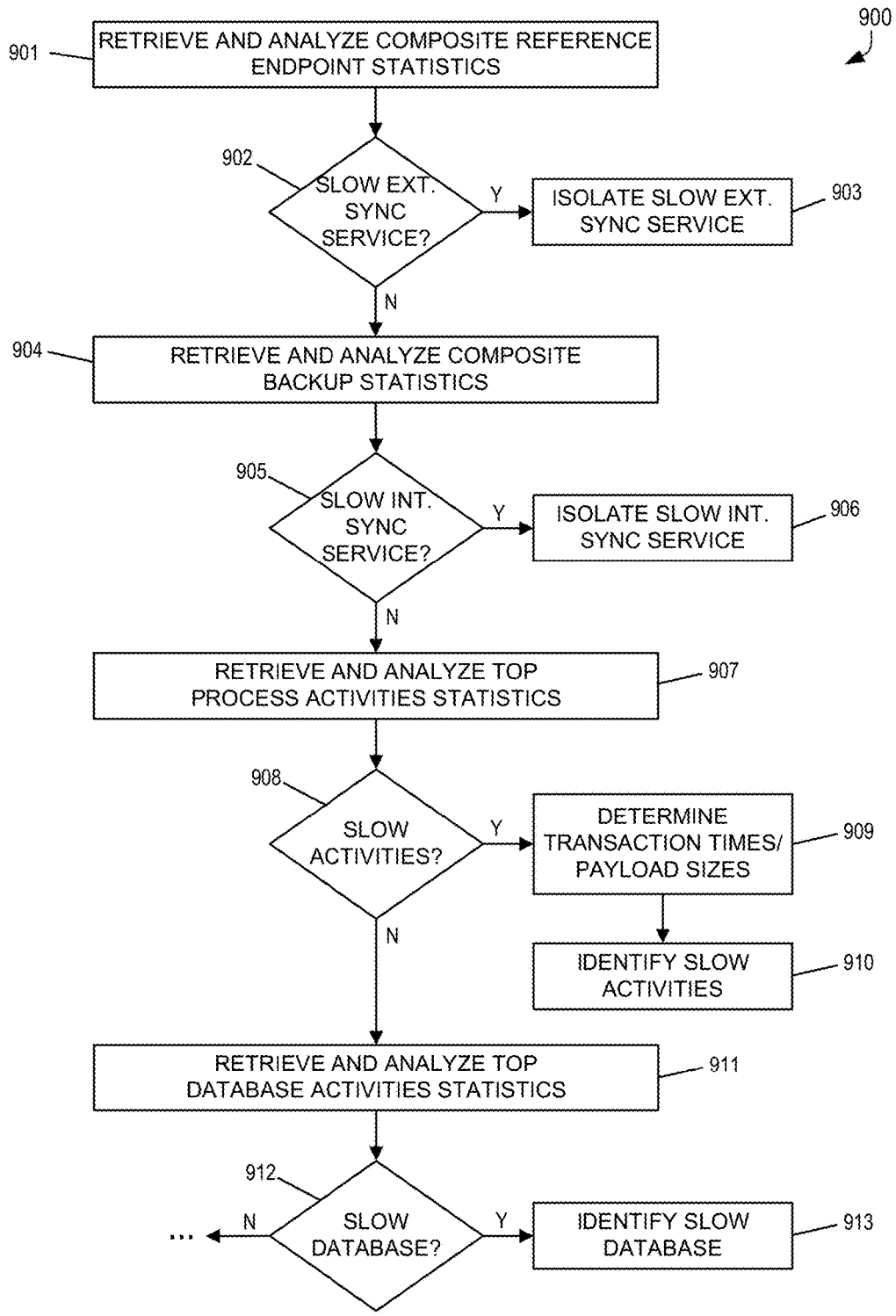
FIG. 9 is a flow diagram illustrating a process for performance analysis and bottleneck detection of an SOA application, according to various embodiments of the present invention.

Referring now to FIG. 9, a flow diagram 900 is shown, which may be implemented in a performance monitor module 114, for performance analysis and bottleneck detection of an SOA application according to various embodiments of the present invention.

Thus, the processing depicted in FIG. 9 may be implemented in software (e.g., code, instructions, program) executed by one or more processing units (e.g., processor cores), hardware, or combinations thereof. The software may be stored in memory (e.g., on a memory device, on a non-transitory computer-readable storage medium, etc.). The particular series of processing steps depicted in FIG. 9 is not intended to be limiting. In one embodiment, the processing depicted in FIG. 9 may be performed by the central performance tracking module 112 and/or the performance monitor module 114 discussed above in FIG. 1.

Flow diagram 900 depicts an implementation of a "top-down/outside-in" analysis for parsing statistical data to diagnose performance issues. In some examples, the "top-down/outside-in" paradigm may be particularly suitable for diagnosing issues in small to medium sized SOA applications, such as where a total number of composites across all domains is less than 100.

A slow performing SOA system invariably means it is not producing desired end-to-end throughput or response, as expected or laid by service contracts. For such bottlenecked systems, backups will typically build in external and/or internal queues.

In some embodiments, snapshot statistics may provide performance metrics that are organized at various levels—starting from highest level at the domain/partition level of granularity. From these high level views, a user (e.g., automated program or system administrator) may quickly identify slow or backed up composites. The user can then refer to other statistics and may focus on only those slow/backed up composites.

A high-level overview is first presented with respect to the illustrated flow diagram 900, and more in-depth examples are presented thereafter with reference to sample statistics. Example flow diagram 900 begins with identifying the slowest external services to determine if the problem is external. Accordingly, in step 901, the composite reference endpoint statistics may be retrieved and analyzed. In some embodiments, the top reference endpoint statistics may be analyzed/examined to check for high latency reference endpoint statistics. In step 902, one or more slow synchronous services can be identified as problematic based on the reference endpoint statistics. For example, if exceptional endpoints are found, then one or more specific slow external synchronous services can be identified as problematic (902: Yes), and these slow external synchronous services may be isolated in step 903.

In some examples, if exceptional endpoints are not found (902:No), then the performance monitor module 114 may conclude that there is no external slow synchronous service, and the flow 900 may continue with determining whether one or more asynchronous external partners are slow. Accordingly, in step 905, the composite backup statistics may be retrieved and analyzed. In some embodiments, this step may include examining composite backup statistics to isolate slow composites, and for these slow composites checking callback statistics—which may include examining the top backup statistics for any found backed-up processes, and the top process statistics for large execution times. In step 905, the performance monitor module 114 may identify one or more slow internal synchronous services as problematic based on the examination of the composite backup statistics. For example, if any backed-up processes are found by examining the top backup statistics and/or if large execution times are found when examining the top process statistics (905:Yes), then the slowest responding asynchronous partners may be identified as causing the problem in step 906.

If none are found, the execution of the flow 900 may determine that the problem is internal to the SOA application, and may continue by checking slow process activities. In step 907, the top process activities statistics may be retrieved and analyzed, for example, to isolate and/or identify slow activities. In step 908, if exceptionally slow activities are found (908:Yes), then the flow 900 has identified the slow activities. In some cases, the flow then may optionally continue in step 909 with determining if the slow activities are encountering exceptionally large transformation times and/or encountering exceptionally large payload sizes, and then isolating the slow activities in step 910.

If no slow activities are identified (908:No), then the flow 900 may determine that the slowdown potentially may be a database issue, and the processing continues with checking database activities. Accordingly, in step 911, the top database activities statistics may be retrieved and analyzed to isolate slow database operations. In step 912, if the performance monitor module 114 isolate slow database operations, a slow database may be identified as a potential cause for the SOA system slowdown in step 913.

Figure 10:
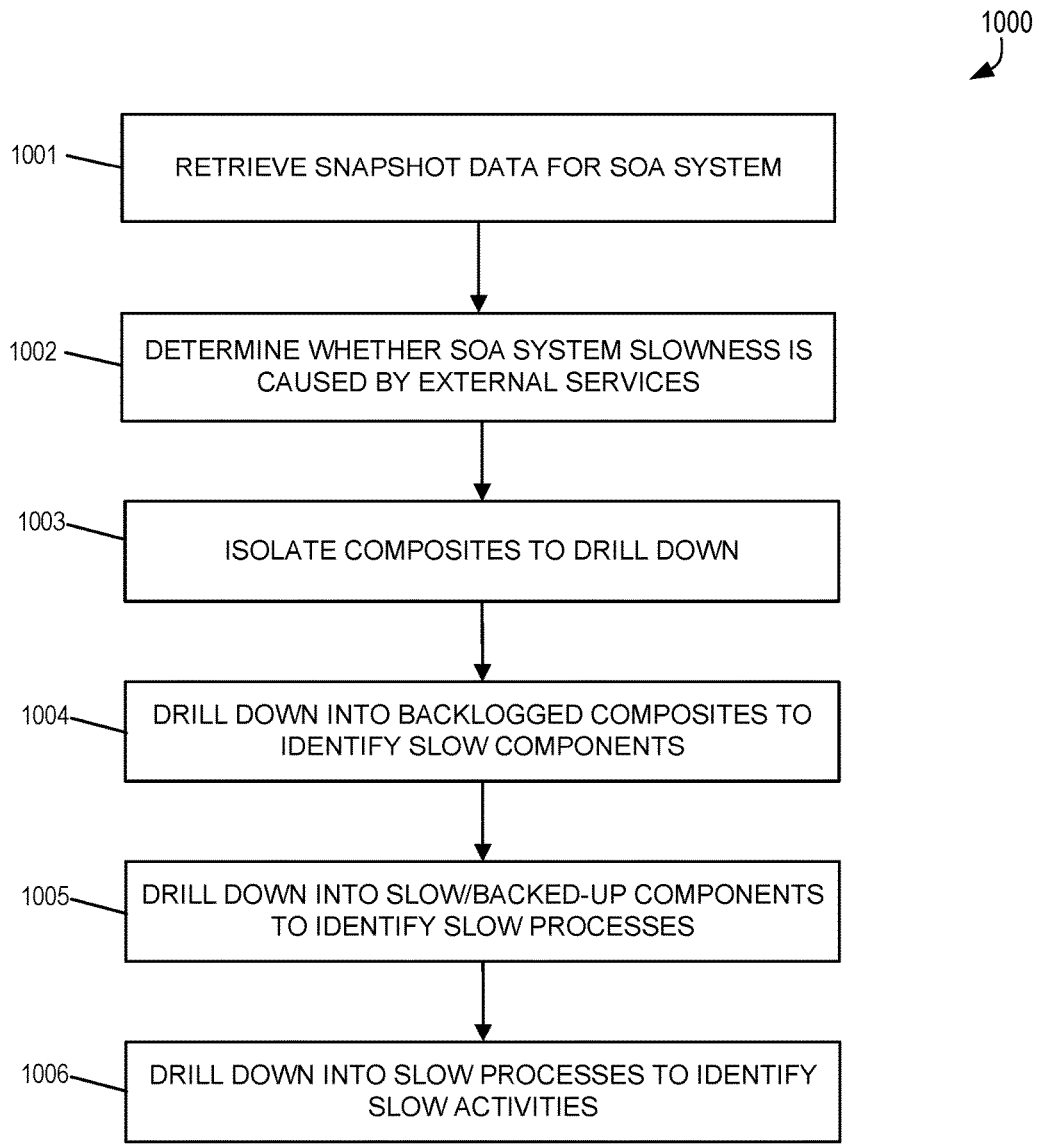
FIG. 10 is a flow diagram illustrating another process for performance analysis and bottleneck detection of an SOA application, according to various embodiments of the present invention.

Referring now to FIG. 10, another flow diagram 1000 is shown, which may be implemented in a performance monitor module 114, for performance analysis and bottleneck detection of an SOA application according to various embodiments of the present invention. As described above in reference to FIG. 9, the general "top-down/outside-in" approach may be based upon the concept of starting from higher level data and then "drilling down" and taking a deeper look into only those parts of application that may be appear to have issues. FIG. 10. illustrates an additional example of such a stepped approach, in the context of a case where the SOA system slowdown issue may be caused by some transformation inside a process that is taking an exorbitant amount of time, and therefore slowing down the entire SOA application.

In this example, before performing a drill down analysis, it may be necessary to retrieve the data to quantify the system behavior. In step 1001, SOA snapshot data 120 may be retrieved, for example, from a database 116. Such data may indicate how slow the system is, what the intake rate is and whether that rate is acceptable, if there more than ordinary backups in the system queues, and any other SOA performance statistics described herein. The snapshot data 120 of embodiments may include such data and may be a starting point of analysis.

In some cases, the data retrieved in step 1001 may include data on the inflow/outflow rate of the system, using service and reference endpoint statistics. Production SOA systems may have certain key composites for which service contracts are defined. The performance metric shown in FIG. 11, as an example, corresponds to an aggregate TPS and latency information for each composite—all inbounds (service endpoints) and outbounds (reference endpoints). This view can provide following information:

a) TPS—End systems (sources and destination) flow rate/latency. For example, refer to the simplified table in FIG. 11, where Composite 1 is interfacing the source system and Composite 3 the target system. If the rate of output to target system is 20 messages/second and is found to violate the service contract (e.g., 50), then a user (e.g., manual or programmatic) may be determined with certainty that there is some problem, and may refer to the intake rate from source system to make sure the intake rate is sufficient. A sufficient value (e.g., 100) may indicate that while enough requests are getting into the SOA system, there is some problem within SOA processing that is causing the slow overall response.

b) Latency—This column in FIG. 11 provides the response of SOA system as seen by caller (for service endpoint stats) and by SOA (for the reference endpoint).

In some embodiments, data collections such as the example shown in FIG. 11 also may include additional information, such as a payload size (e.g., min, max and/or average) for the tables. This additional information may be important, for instance, because payload size may have a significant influence on an overall performance of SOA system.

Additionally, the data retrieved in step 1001 may include backup data for external queues, using backlog statistics. Large or increasing queue backup (i.e., a number of requests waiting in a queue) may be symptom of a slow/non-performing SOA system. For an application that reads/writes from/to an external queue (source/target systems or for inter composite) communication, it may be useful to retrieve this data for current backups. Out of the ordinary or rising values of backups in user defined queues may be another indication of system deterioration.

In some embodiments, high level composite backlog statistics may be provide sufficient data for these determinations based on the composite level, as illustrated by the example table shown in FIG. 12. In this example, "service" type may indicate that the SOA application is reading messages from a queue and likewise, a "reference" type may indicate that the SOA application writes to the queue. In this example, a user may quickly see that there are ten (10) messages backlogged for Composite 1 and Queue 1, and five (5) messages from this queue are under processing. The user (e.g., manually or programmatically) may compare these values with those from a snapshot of healthy period of the SOA system operation, in order to make a determination regarding whether a processing issue exists or not.

In step 1002, the flow 1000 may determine whether the SOA system slowness is being caused by external/partner services, for example, using reference endpoint statistics. In this example, now that it has been established that the end system is slow, but that intake rate is acceptable, and it has also been established that backups are building, we know that there definitely is one or more performance issues. However, before looking inside the SOA system, the flow 1000 may first attempt to rule out the behavior of external services as a cause for the problems. As discussed above, part of processing of the SOA system may depend on various interactions with external/partners services.

Referring now to the example endpoint statistics table shown in FIG. 13, it may be assumed in this case that Composite 2 may write to a database through a database adapter. A comparison of the TPS value to corresponding values during healthy/normal periods of the SOA system (e.g., from previous snapshots, or from calculated average values across multiple snapshots) may allow the algorithm used by the flow 1000 (e.g., executed by the performance monitor module 114) to eliminate the possibility that the slowness in the SOA system is due to external factors.

Although certain examples may refer to a synchronous case, an asynchronous callback may be modeled as SER- VICE type and REFERENCE type and therefore may indicate the number of outbound requests and the number of responses from the external partner. Together, these two entries may indicate how an asynchronous external partner is behaving in terms of response time (e.g., average time taken by partner to receive the request).

In step 1003, the flow 1000 (e.g., as executed by the performance monitor module 114) may isolate the composites to drill down, for example, by retrieving and examining the backups in internal queues, using internal backlog statistics for composites. As discussed above, reduced output has been detected in this example, and if this point has been reached in the flow 1000, it may be concluded that that the performance issue is within the SOA application.

Certain SOA applications may include asynchronous interactions between components of a same composite, other composites, and also with external services. Additionally, service engines of an SOA system may run independent of each other and those components handle asynchronous communications maintain internal queues where incoming messages are held (or en-queued) prior to processing. For example, an engine may maintain an internal queue (e.g., a call dispatcher queue) where asynchronous incoming messages first may be inserted. Similarly, an engine may maintain internal queue to hold messages pushed by a publisher. Using data of queue backups related to various processes, the composites may be examined to determine if some of the downstream processes are performing slow. The resource/configuration of components (e.g., numbers of threads) also may be examined and potentially tuned to improve the performance of the downstream processes.

Referring now to example table FIG. 14, in this example the shaded cells indicate extraordinary backups (i.e., backlogs) building for composite 2. Additionally, the number of active requests may be determined to be unusually high. Accordingly, based on the analysis of this data, the flow 1000 may continue by looking further into Composite 2 for additional analysis.

In step 1004, the flow 1000 may drill down into one or more backlogged composite(s) to find slow components, for example, using internal backlog statistics for the components. As discussed above, step 1003 may identify one or more composites high backlog. Next, in step 1004, the performance metrics corresponding to the identified composite(s) may be examined for further information. For example, backup may be a function of producer and consumer threads (or processes/modules), where the consumer may be slower than the producer. A consumer thread may be slow for various reasons, such as a slow activity (e.g., a large transformation), a large payload, an internal synchronous process call that may take atypically long to return, etc. To provide further insight, the detailed statistics for backup for the composite broken down at component level may be retrieved and analyzed to detect that Composite 2 is experiencing a performance issue due to a large backlog value. For example, referring to FIG. 15, this example table shows a simplified (or "reduced") view where only the active/backlog columns are shown. In this example, the backlog statistic captures additional data related to the queues and include columns that indicate the inflow/outflow/closed/faulted counts for the snapshot, as described above.

In step 1005, the flow 1000 may drill down into one or more slow and/or backed-up components to identify slow processes (e.g., subcomponents) within the components, for example, using business process instance statistics. As discussed above, step 1004 may narrow down the issue to one or more specific components. Therefore, flow 1000 may continue in step 1005 by referring to overall statistics for these components, for example, by examining the overall execution time for the components to determine whether the execution time is within a "normal" range or acceptable deviation (e.g., within a threshold) from the expected execution time. Referring now to FIG. 16, an example table is shown including component statistics. Due to space constraints, the example table in FIG. 16 does not include data within the domain and partition columns, denoted by D and P. In this example, for the "BPEL 2" component (identified in 1004 above), the data showing the statistics for completed processes indicates an average time of 900 ms. However, based upon historical data in this example (e.g., previous snapshots), it may be determined that the usual execution time is around 50 ms. Thus, it may be concluded that the "BPEL 2" component is performing much slower than normal, and flow 1000 may continue by looking into individual activities (or subcomponents) of this component.

In step 1006, the flow 1000 may drill down into the slow process(es) identified in step 1005, in order to identify one or more slow activities occurring within those processes, for example, by retrieving and analyzing business process activity statistics. Continuing the above example, in step 1005 the component "BPEL 2" was identified as performing atypically slow. Accordingly, in step 1006, the flow 1000 continues by examining the activity statistics for the "BPEL 2" component. Referring now to FIG. 17, an example table is shown including business process activity statistics for the BPEL 2 component of Composite 1. In this example, due to space constraints, the FIG. 17 does not include data for the domain and partition columns (denoted by D and P). In this example, the data in FIG. 17 suggests that the "Transform1" activity (or subcomponent) of this component is taking on average 850 ms, which may be determined to be significantly higher than the normal average execution time. This data may suggest, as a potential explanation, that a payload may have changed that caused this transformation to take much longer than it previously did, and thus that a system administrator may be provided the necessary information to investigate this component and activity further. In certain embodiments, data views such as the one shown in FIG. 17 may include a minimum, maximum, and/or average payload size, which may allow the flow 1000 to determine whether or not a payload size is atypical.

Figure 18:
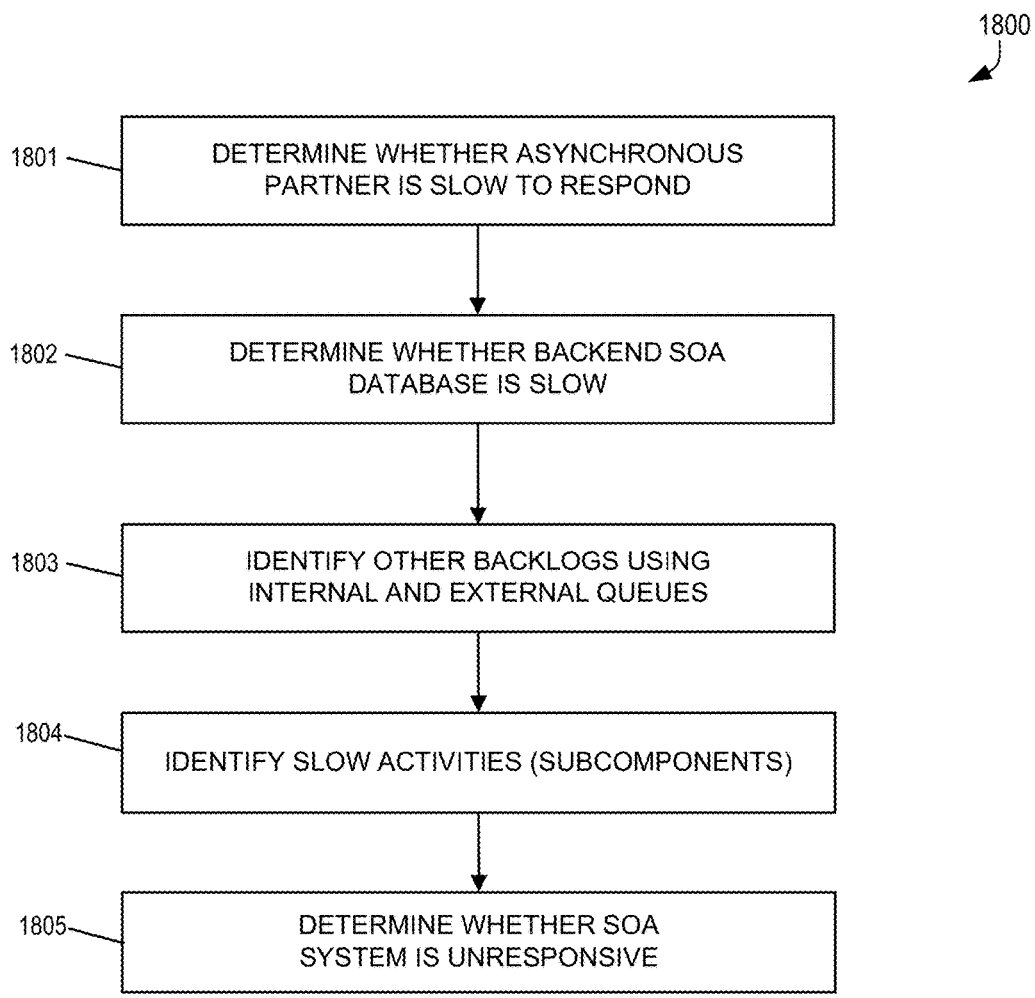
FIG. 18 is a flow diagram illustrating another process for performance analysis and bottleneck detection of an SOA application, according to various embodiments of the present invention.

Referring now to FIG. 18, another flow 1800 is shown, which may be implemented in a performance monitor module 114, for performance analysis and bottleneck detection of an SOA application according to various embodiments of the present invention. Flow 1800 is an examples of another approach to identifying performance issues in a SOA application, which may be referred to as a "postulate theory" approach. For larger SOA applications, and/or for experienced users or advanced automated tools, it may be more efficient to initially examine data related to known or commonly occurring issues. The example outlined in flow 1800 describes various common issues and provides details regarding how such issues may be identified and isolated based on the generated statistics.

This specific example of a "postulate theory" approach begins in step 1801, where the flow 1800 (e.g., executed by the performance monitor module 114) may initially determine whether one or more of the asynchronous partners of the SOA system are slow to respond. In this example, is it noted that a common problem with SOA system performance degradation and bottlenecks may be due to slow interacting asynchronous partners, and thus the "postulate theory" analysis in flow 1800 may begin by directly referring to particular statistics to retrieve data to establish whether or not the slowness is caused by slow interacting asynchronous partners. The instances of processes doing asynchronous communications with partners that take a long time to respond will "dehydrate" (e.g., be persisted into storage and later brought back into active processing when an expected response is received—or, be "re-hydrated"). In some embodiments, statistics for completed processes may capture the data that breaks down the execution of instance to active (e.g., the actual time the instance was loaded in memory and executing various process activities) and dehydrate (e.g., the time it was dehydrated) time. Examination of the dehydrated column may indicate how long a process has been dehydrated. If this dehydration time is deemed exceptional (e.g., greater than a predetermined threshold), then this may indicate that the problems of the SOA system are due to a partner taking a long amount of time to callback (note that the other possibilities may include the existence of wait/dehydrate activity, etc., in the process). Thus, step 1801 may include retrieving and analyzing statistics for completed and de-hydrated processes. Also, step 1801 may include examining the dehydration details table, which presents a breakdown of the dehydration time and links it to a specific activity on which the instances were dehydrated or currently dehydrated (for open instances).

Referring now to FIG. 19, an example table is shown of business process instance statistics for completed instances. In this example, the table in FIG. 19 indicates that the component "BPEL A" on average took little over 10 minutes to complete, but a large portion of that time was spent as "dehydrated"—around 10 minutes. In this example, due to space constraints, the FIG. 19 does not include data for the domain, partition, component columns (denoted by D, P, and C).

Referring now to FIG. 20, another example table is shown of business process instance statistics for completed instances, including dehydration details. In this example, further analyses of the dehydration details in FIG. 20 indicates that there are two dehydration points in the component "BPEL A" (evidenced by two rows for this process). The process dehydrated for an average of 40 seconds while waiting on a callback from partner service linked to "Receive 1." The process also dehydrated for an average of 5 seconds on "Receive 2." In this example, if the time of 40 seconds is determined to be higher than normal (e.g., exceptional), then further analysis/investigation may be initiated as to why the partner is taking such a long time to callback. Accordingly, in this example, the performance issue has been identified in step 1801 as the partner is taking a long time to respond to callback. As a result, the flow 1800 may determine and/or initiate corrective action, for example, determining which partner this receive activity is connected to, and then notifying and/or inquiring as to why the partner is taking too long to respond.

Referring now to FIG. 21, another example table is shown of business process instance statistics for incomplete instances. The tables shown in FIGS. 19 and 20 provided data for completed instances; however, in some cases there may be one or more instances that are in-flight and dehydrated while waiting for callback. Accordingly, the table in FIG. 21 includes such data, and indicates the last activity under execution, as well as whether the instance is currently in a dehydrated state or not. This table also lists the average time the in-flight instances were active and dehydrated, allowing useful analyses to be performed and inferences to be drawn based on the business process instance statistics for incomplete instances.

In step 1802, the flow 1800 (e.g., executed by the performance monitor module 114) may determine whether or not a backend SOA database is slow. As discussed above, occasionally situations may arise where the slowness of an SOA system is due to a slow database. SOA components may use a backend SOA database for various tasks, such as message persistence (e.g., storing of incoming asynchronous requests), dehydration of long-running asynchronous instances, etc. Therefore, an overloaded and/or stressed database may cause SOA processing to slow down. In various embodiments, one or two different mechanisms may be used to identify the slowness in the SOA backend database. The first is direct identification, by retrieving and analyzing the database activity statistics, while the other may be more indirect, including retrieving and analyzing the wire stats.

For example, referring now to FIG. 22, an example table is shown including statistics for database operations by a SOA service engine, and the average execution times. In some cases, comparisons of such values to corresponding values during healthy/baseline periods may be used to indicate the performance of database operations, As another example, referring now to FIG. 23, an example table is shown including wire statistics. As noted above, these are among the other statistics that may indicate that a back-end SOA database is causing the slowness of the SOA system. In some embodiments, a BPEL engine component may be implemented that uses a database to store incoming requests. If the project contains asynchronous BPEL processes, the BPEL engine data may be retrieved and analyzed to determine if the back-end database is slow. First, the process may examine the wire statistics, which capture the latency for the wires interconnecting the components, and may identify the wires that are for this "BPEL engine" component and asynchronous type. Note that in this example, due to space constraints, FIG. 23 does not include data for the domain, partition, component columns (denoted by D, P, and C).

In this example, the "Wire ID" column may include values that are derived from composite wire element, for example, a concatenation of a source URI and a destination URI. As seen in FIG. 23, the latency observed at the wires connecting the web service binding to the BPEL engine for asynchronous (in-only) is nearly one second. From predetermined knowledge of this SOA system and/or from an analysis of the BPEL engine code, it may be determined that the first task that BPEL engine does with incoming message is to store them in the database. Therefore, if under normal circumstances it takes 50 ms on average, a time of nearly one second indicates that the database is suffering from performance issues. In some embodiments, further drilling down and analyses may be performed on this data, and internal statistics may be retrieved for the "BPEL engine" component to confirm this determination.

In step 1803, the flow 1800 may identify backlogs using performance metrics for internal and/or external queues of the SOA system. As discussed above, creating a scalable SOA architecture may involve utilizing decoupled systems often separated by queues, such as JMS queues. Thus, composites may read and write to global queues defined by a user. Also, service engines that handle asynchronous communications may persist incoming messages and store them on internal queues prior to processing. Such SOA architectures may result in various "sink" points in the system, that is, places where messages may be queued up. In such cases, a bottlenecked and/or underperforming system may be identified by the presence of large and/or unusual backups in these user-defined (global) and internal queues.

In some embodiments, the snapshot statistical data 120 may include data for the backlogs (also referred to as "backups") in user-defined queues as well as in internal queues. In some cases, such data may be captured for the snapshot, while cumulative data also may be kept for historical analysis and snapshot comparisons. Referring now to FIG. 24, an example table is shown including SOA system data for queue backlogs. This table shows backup in various application queues, external or internal, including the backlog and active counts (e.g., messages in flight), and also provides data such as added/removed/closed and faulted for the snapshot as well as cumulative. For the inbound queues (that feed into the SOA system), the external system may be adding messages, while for outbound queues the SOA may push the messages. Referring now to FIG. 25, another example table is shown including, among other things, the total active and backlogs in internal queues (highlighted), and also data related to snapshot activity (e.g., added/removed/closed/faulted), and cumulative data since a beginning time period (e.g., server start) for each component.

In step 1804, the flow 1800 may identify slow activities and/or subcompoents within the SOA system. In some cases, an SOA system may degrade in performance due to excessive time taken by certain activities (e.g., subcomponents) within various components. For instance, some XSL transformations defined in a business process component may take a very long time to complete if the SOA system was originally designed for a small payload size, and suddenly was pushed a much larger payload. Even prior to reaching the transformation activity, a payload may undergo multiple transformations in various SOA layers. Thus, it may be important in some cases to capture statistics for the activity execution time for user-defined activities, starting at a high level such as a complete business process component, to activities defined inside a process (e.g., subcomponents), to key internal activities. In some cases, activity statistics may capture this data as an aggregated metric, as illustrated in the example business process activity data table shown in FIG. 26.

In step 1805, the flow 1800 may determine whether the SOA system is unresponsive (e.g., stuck and/or not producing any output or logging any transaction timeout errors), which of course may be another potential cause for SOA system slowness. This determination may represent extreme circumstances for the SOA system in which the execution threads may be stuck, for instance, due to some internal synchronous process or external service holding the threads for a long time, etc. However, in some cases, just because threads are stuck does not mean that transaction time-out errors will necessarily occur. Rather, such errors may happen when the process working on the thread releases it in a time that exceeds the configured transaction time-out for the system (e.g., five minutes). Under extreme circumstances, threads might be held for very long time, therefore giving the impression of the SOA system being stuck.

Some traditional approaches for diagnosing such systems employ tools to identify the stuck threads in the system. Other options to obtain this data may include running diagnostic dumps, or analyze multiple thread dumps taken at various intervals for a stuck system. Thread dump analysis of a stuck thread may including showing the stack trace to identify the components whose threads are stuck. Although these traditional approaches and tools may eventually help identify stuck threads, by narrowing them down to those components where threads originate and which are stuck, such analyses may be tedious and may require substantial manual intervention, expertise, and time. In contrast, the generation of transaction statistics in various embodiments may provide the data to remove the burden of these tedious analyses. Additionally, since a thread may span component/composite boundaries, various embodiments may provide breakdown data of the time spent by the thread as it moves from one component to another component, etc.

For example, referring again to the example presented with respect to FIG. 7. In this example, an in-only request is delivered to a BPEL process—BP1. The process then calls a sub-process BP2 synchronously, then calls an external service, and then finally writes to a file. If the overall throughput of the system is low, the problem could be anywhere. While the above statistics (e.g., endpoint statistics, activity statistics, etc.) may determine if the external service is slow or if some activity within SOA system is taking a long time, these statistics cannot assist if the SOA system is completely stuck and not responding at all, or if transaction timeouts are occurring. Thus, embodiments may include "transactions data" that can help identify these issues as well.

Transactions statistics, such as those shown in the top portion of FIG. 8, may show the "top" transactions, or the transactions taking the most time. In some embodiments, these statistics may be an calculated as an aggregated metric (e.g., an average of all transactions for the snapshot). Transaction breakdown statistics are shown in the bottom portion of FIG. 8. As shown in this example, a transaction may span multiple components, composites, and even SOA boundaries (e.g., by making calls to external service(s)). Another valid paradigm for analyzing slow SOA systems is to start from the "top" transactions (identified by transaction statistics), and then analyzing the associated breakdown statistics to determine where the time was spent as the thread "hops" components. In the transaction statistics breakdown table for the scenario described above with respect to FIGS. 7 and 8, of the total execution time of around 60 seconds, approximately 59 seconds is spent from point 5 to point 6. Thus, we can determine that the external service is taking the most time and likely the cause of the performance issue.

Additionally, although not shown in the example table of FIG. 8, in some embodiments the snapshot data 120 also may include transaction statistics for "open" transactions which would encompass the stuck scenario. Such statistics would not be aggregate in some embodiments, but instead may individually list all of the threads. However, certain embodiments might not keep such individual statistics in the snapshots due to storage size considerations, and thus the decision to include them may be automatically determined and/or user-configurable based upon storage determinations.

As an example of other use-cases, certain systems employ a notion of an "Event Type," or a message structure that ties producers and consumers. One or more producers may push messages of a given event type to these systems. Similarly, one of more consumers can consume messages of a given event type. For some large applications, due to the sheer number of components, it may be impractical to initially display statistics at the component level. Accordingly, embodiments may show the total backlog on a per-composite basis, as illustrated in the example table shown in FIG. 27. In this example, the values may be derived for a given composite (the data is aggregated, and measures aggregate counts since a server start time) as follows:

backlog=total of all events added by any component belonging to this composite, i.e., a total of all events consumed by all components in this composite active=total number of active threads tied to any component for this composite, consuming all event types Continuing this use-case, once a backup is determined for a given composite, the flow executed (e.g., by the performance monitor module 114) may drill down and retrieved data for INBOUND and OUTBOUND statistics at the component level, as illustrated in the example tables shown in FIG. 28. The two tables shown in FIG. 28 break down the producer and consumer based upon event type. For a given event type, the producer and consumer components may potentially be totally different. In this case, the critical information may be readily determined using the data, for example:
- (a) snapshot activity—how many were added/removed in the last interval.
- (b) outcomes—if successfully delivered we will see entries in closed column but if the downstream component is down, the removed events will be faulting thus user will see them those values in faulted columns—snapshot as well as cumulative.
- (c) active—if the downstream system were to hold the thread—for whatever reason, the active count will match the thread count and system will appear stuck.

Figure 29:
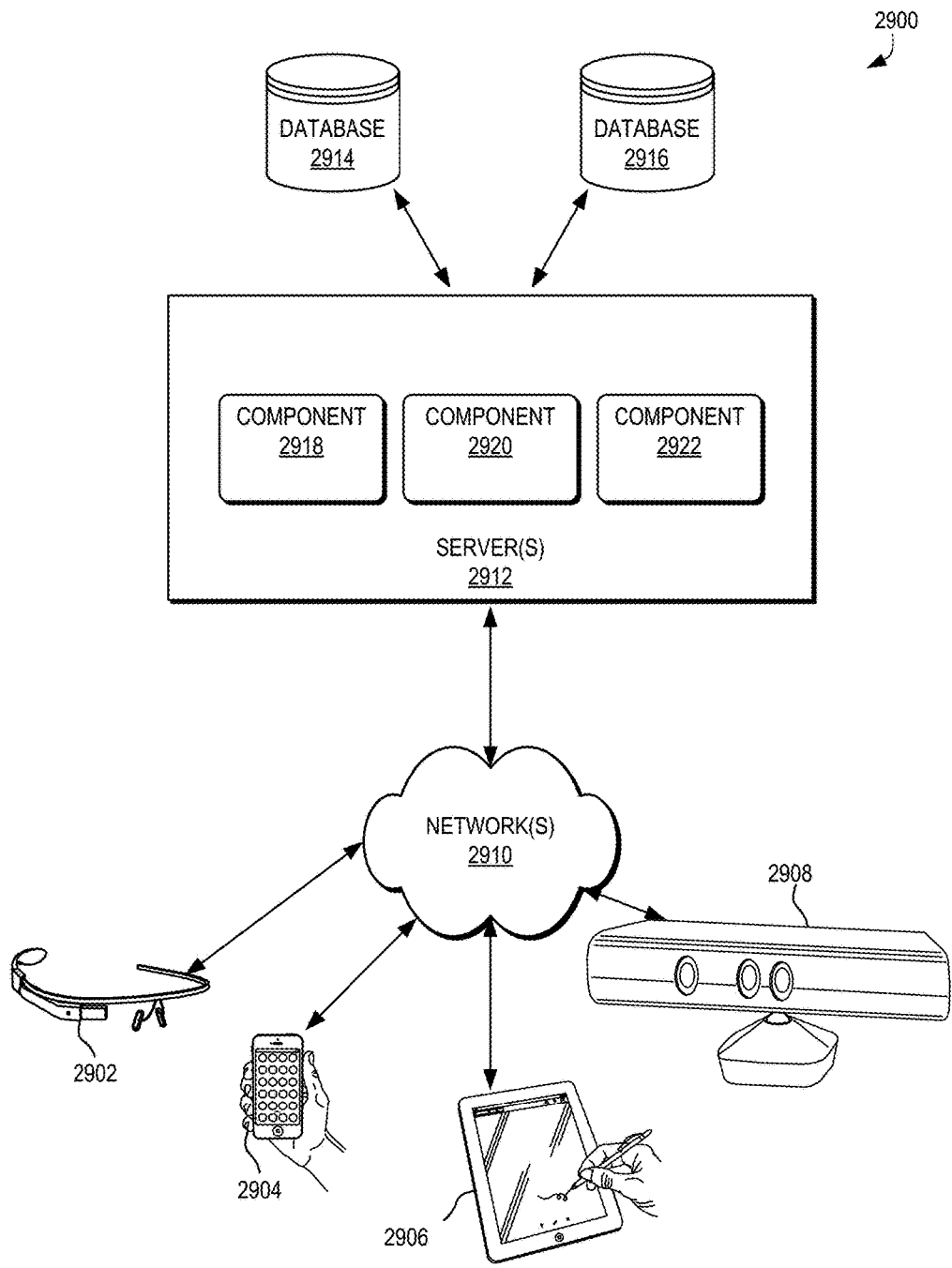
FIG. 29 illustrates a simplified diagram of a distributed system for implementing some embodiments of the present invention.

FIG. 29 illustrates a simplified diagram of a distributed system for implementing some embodiments of the present invention. In the illustrated embodiment, distributed system 2900 includes one or more client computing devices 2902, 2904, 2906, and 2908, which are configured to execute and operate a client application such as a web browser, proprietary client (e.g., Oracle Forms), or the like over one or more network(s) 2910. Server 2912 may be communicatively coupled with remote client computing devices 2902, 2904, 2906, and 2908 via network 2910.

In various embodiments, server 2912 may be adapted to run one or more services or software applications such as services and applications that provide SAO system processing. In certain embodiments, server 2912 may also provide other services or software applications that can include non-virtual and virtual environments. In some embodiments, these services may be offered as web-based or cloud services or under a Software as a Service (SaaS) model to the users of client computing devices 2902, 2904, 2906, and/or 2908. Users operating client computing devices 2902, 2904, 2906, and/or 2908 may in turn utilize one or more client applications to interact with server 2912 to utilize the services provided by these components.

In the configuration depicted in FIG. 29, software components 2918, 2920, and 2922 of system 2900 are shown as being implemented on server 2912.

These components may include one or more of underlying SOA system backend components, the components/composites of a SOA application 102, the central performance tracking module of FIG. 1, the performance monitor module of FIG. 1, and/or the report generation module of FIG. 1.

In other embodiments, one or more of the components of system 2900 and/or the services provided by these components may also be implemented by one or more of the client computing devices 2902, 2904, 2906, and/or 2908. Users operating the client computing devices may then utilize one or more client applications to use the services provided by these components. These components may be implemented in hardware, firmware, software, or combinations thereof. It should be appreciated that various different system configurations are possible, which may be different from distributed system 2900. The embodiment shown in FIG. 29 is thus one example of a distributed system for implementing an embodiment system and is not intended to be limiting.

Client computing devices 2902, 2904, 2906, and/or 2908 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 2910.

Although distributed system 2900 in FIG. 29 is shown with four client computing devices, any number of client computing devices may be supported. Other devices, such as devices with sensors, etc., may interact with server 2912.

Network(s) 2910 in distributed system 2900 may be any type of network familiar to those skilled in the art that can support data communications using any of a variety of available protocols, including without limitation TCP/IP (transmission control protocol/Internet protocol), SNA (systems network architecture), IPX (Internet packet exchange), APPLETALK™, and the like. Merely by way of example, network(s) 2910 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, BLUETOOTH™, and/or any other wireless protocol), and/or any combination of these and/or other networks.

Server 2912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 2912 can include one or more virtual machines running virtual operating systems, or other computing architectures involving virtualization. One or more flexible pools of logical storage devices can be virtualized to maintain virtual storage devices for the server. Virtual networks can be controlled by server 2912 using software defined networking. In various embodiments, server 2912 may be adapted to run one or more services or software applications described in the foregoing disclosure. For example, server 2912 may correspond to a server for performing processing as described above according to an embodiment of the present disclosure.

Server 2912 may run an operating system including any of those discussed above, as well as any commercially available server operating system. Server 2912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 2912 may include one or more applications to analyze and consolidate data feeds and/or event updates received from users of client computing devices 2902, 2904, 2906, and 2908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2912 may also include one or more applications to display the data feeds and/or real-time events via one or more display devices of client computing devices 2902, 2904, 2906, and 2908.

Distributed system 2900 may also include one or more databases 2914 and 2916. These databases may provide a mechanism for storing information such as user interactions information, usage patterns information, adaptation rules information, and other information used by embodiments of the present invention.

For example, databases 2914 and 2916 may store backend SOA data (as described herein, for example, storing dehydrated processes and/or messages in queues) and/or store data for specific SOA applications.

Databases 2914 and 2916 may reside in a variety of locations. By way of example, one or more of databases 2914 and 2916 may reside on a non-transitory storage medium local to (and/or resident in) server 2912. Alternatively, databases 2914 and 2916 may be remote from server 2912 and in communication with server 2912 via a network-based or dedicated connection. In one set of embodiments, databases 2914 and 2916 may reside in a storage-area network (SAN). Similarly, any necessary files for performing the functions attributed to server 2912 may be stored locally on server 2912 and/or remotely, as appropriate. In one set of embodiments, databases 2914 and 2916 may include relational databases, such as databases provided by Oracle, that are adapted to store, update, and retrieve data in response to SQL-formatted commands.

Figure 30:
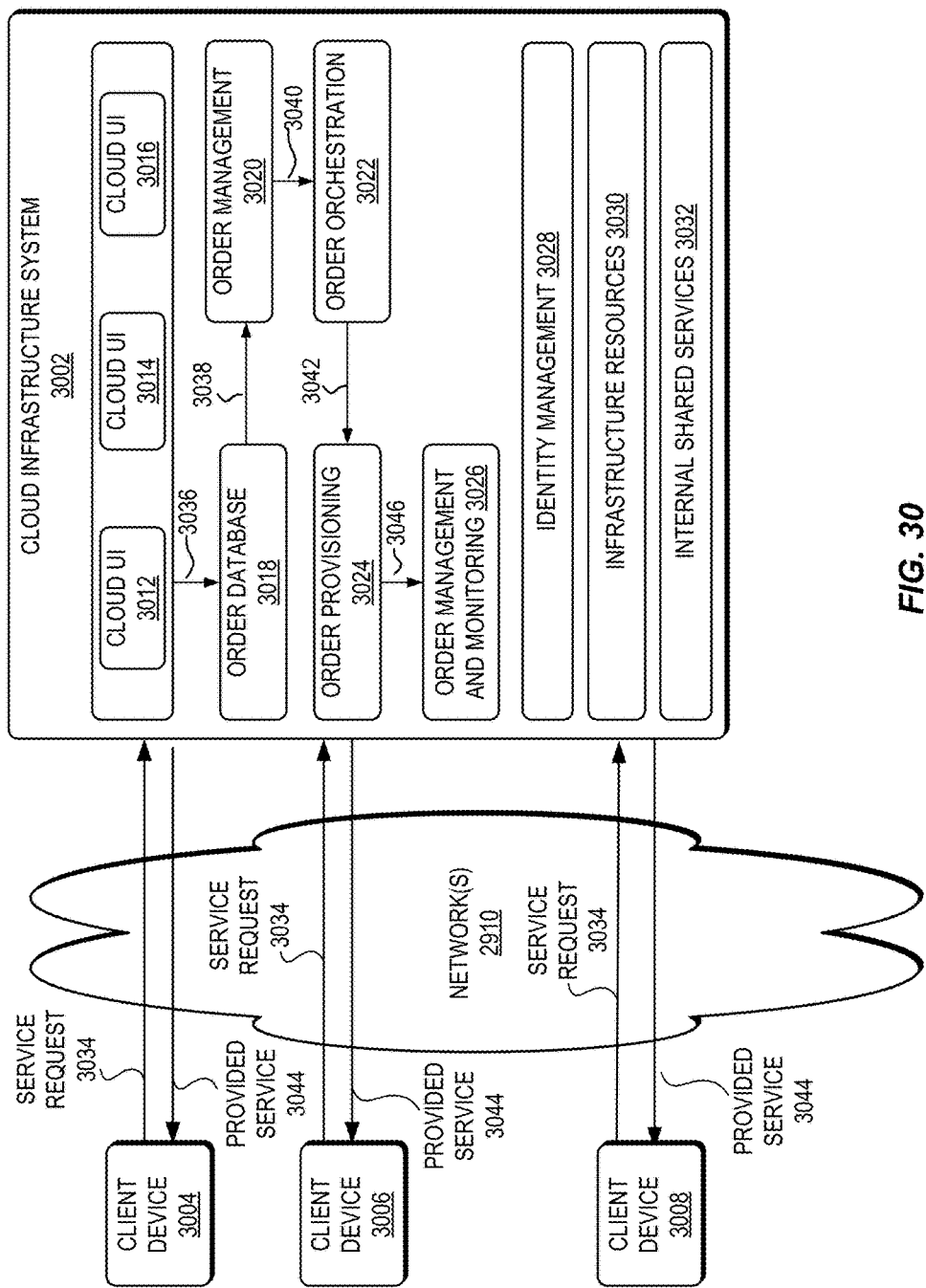
FIG. 30 is a simplified block diagram of one or more components of a system environment in which services may be offered as cloud services, in accordance with some embodiments of the present invention.

In some embodiments, the SOA system/applications may be offered as services via a cloud environment. FIG. 30 is a simplified block diagram of one or more components of a system environment 3000 in which services may be offered as cloud services, in accordance with some embodiments of the present disclosure. In the illustrated embodiment in FIG. 30, system environment 3000 includes one or more client computing devices 3004, 3006, and 3008 that may be used by users to interact with a cloud infrastructure system 3002 that provides cloud services. Cloud infrastructure system 3002 may comprise one or more computers and/or servers that may include those described above for server 2912.

It should be appreciated that cloud infrastructure system 3002 depicted in FIG. 30 may have other components than those depicted. Further, the embodiment shown in FIG. 30 is only one example of a cloud infrastructure system that may incorporate an embodiment of the invention. In some other embodiments, cloud infrastructure system 3002 may have more or fewer components than shown in the figure, may combine two or more components, or may have a different configuration or arrangement of components.

Client computing devices 3004, 3006, and 3008 may be devices similar to those described above for 2902, 2904, 2906, and 2908. Client computing devices 3004, 3006, and 3008 may be configured to operate a client application such as a web browser, a proprietary client application (e.g., Oracle Forms), or some other application, which may be used by a user of the client computing device to interact with cloud infrastructure system 3002 to use services provided by cloud infrastructure system 3002. Although exemplary system environment 3000 is shown with three client computing devices, any number of client computing devices may be supported. Other devices such as devices with sensors, etc. may interact with cloud infrastructure system 3002.

Network(s) 2910 may facilitate communications and exchange of data between clients 3004, 3006, and 3008 and cloud infrastructure system 3002. Each network may be any type of network familiar to those skilled in the art that can support data communications using any of a variety of commercially-available protocols, including those described above for network(s) 2910.

In certain embodiments, services provided by cloud infrastructure system 3002 may include a host of services that are made available to users of the cloud infrastructure system on demand. In addition to services related to providing SOA application services, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 3002 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 3002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 3002 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 3002 may be adapted to automatically provision, manage and track a customer's subscription to services offered by cloud infrastructure system 3002. Cloud infrastructure system 3002 may provide the cloud services via different deployment models. For example, services may be provided under a public cloud model in which cloud infrastructure system 3002 is owned by an organization selling cloud services (e.g., owned by Oracle Corporation) and the services are made available to the general public or different industry enterprises. As another example, services may be provided under a private cloud model in which cloud infrastructure system 3002 is operated solely for a single organization and may provide services for one or more entities within the organization. The cloud services may also be provided under a community cloud model in which cloud infrastructure system 3002 and the services provided by cloud infrastructure system 3002 are shared by several organizations in a related community. The cloud services may also be provided under a hybrid cloud model, which is a combination of two or more different models.

In some embodiments, the services provided by cloud infrastructure system 3002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 3002 then performs processing to provide the services in the customer's subscription order.

In some embodiments, the services provided by cloud infrastructure system 3002 may include, without limitation, application services, platform services, and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 3002 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 3002 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 3002 may also include infrastructure resources 3030 for providing the resources used to provide various services to customers of the cloud infrastructure system. In one embodiment, infrastructure resources 3030 may include pre-integrated and optimized combinations of hardware, such as servers, storage, and networking resources to execute the services provided by the PaaS platform and the SaaS platform, and other resources.

In some embodiments, resources in cloud infrastructure system 3002 may be shared by multiple users and dynamically re-allocated per demand. Additionally, resources may be allocated to users in different time zones. For example, cloud infrastructure system 3002 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 3032 may be provided that are shared by different components or modules of cloud infrastructure system 3002 to enable provisioning of services by cloud infrastructure system 3002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 3002 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 3002, and the like.

In one embodiment, as depicted in FIG. 30, cloud management functionality may be provided by one or more modules, such as an order management module 3020, an order orchestration module 3022, an order provisioning module 3024, an order management and monitoring module 3026, and an identity management module 3028. These modules may include or be provided using one or more computers and/or servers, which may be general purpose computers, specialized server computers, server farms, server clusters, or any other appropriate arrangement and/or combination.

In an exemplary operation, at 3034, a customer using a client device, such as client device 3004, 3006 or 3008, may interact with cloud infrastructure system 3002 by requesting one or more services provided by cloud infrastructure system 3002 and placing an order for a subscription for one or more services offered by cloud infrastructure system 3002. In certain embodiments, the customer may access a cloud User Interface (UI) such as cloud UI 3012, cloud UI 3014 and/or cloud UI 3016 and place a subscription order via these UIs. The order information received by cloud infrastructure system 3002 in response to the customer placing an order may include information identifying the customer and one or more services offered by the cloud infrastructure system 3002 that the customer intends to subscribe to.

At 3036, the order information received from the customer may be stored in an order database 3018. If this is a new order, a new record may be created for the order. In one embodiment, order database 3018 can be one of several databases operated by cloud infrastructure system 3018 and operated in conjunction with other system elements.

At 3038, the order information may be forwarded to an order management module 3020 that may be configured to perform billing and accounting functions related to the order, such as verifying the order, and upon verification, booking the order.

At 3040, information regarding the order may be communicated to an order orchestration module 3022 that is configured to orchestrate the provisioning of services and resources for the order placed by the customer. In some instances, order orchestration module 3022 may use the services of order provisioning module 3024 for the provisioning. In certain embodiments, order orchestration module 3022 enables the management of business processes associated with each order and applies business logic to determine whether an order should proceed to provisioning.

As shown in the embodiment depicted in FIG. 30, at 3042, upon receiving an order for a new subscription, order orchestration module 3022 sends a request to order provisioning module 3024 to allocate resources and configure resources needed to fulfill the subscription order. Order provisioning module 3024 enables the allocation of resources for the services ordered by the customer. Order provisioning module 3024 provides a level of abstraction between the cloud services provided by cloud infrastructure system 3000 and the physical implementation layer that is used to provision the resources for providing the requested services. This enables order orchestration module 3022 to be isolated from implementation details, such as whether or not services and resources are actually provisioned on the fly or pre-provisioned and only allocated/assigned upon request.

At 3044, once the services and resources are provisioned, a notification may be sent to the subscribing customers indicating that the requested service is now ready for use. In some instance, information (e.g. a link) may be sent to the customer that enables the customer to start using the requested services.

At 3046, a customer's subscription order may be managed and tracked by an order management and monitoring module 3026. In some instances, order management and monitoring module 3026 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 3000 may include an identity management module 3028 that is configured to provide identity services, such as access management and authorization services in cloud infrastructure system 3000. In some embodiments, identity management module 3028 may control information about customers who wish to utilize the services provided by cloud infrastructure system 3002. Such information can include information that authenticates the identities of such customers and information that describes which actions those customers are authorized to perform relative to various system resources (e.g., files, directories, applications, communication ports, memory segments, etc.) Identity management module 3028 may also include the management of descriptive information about each customer and about how and by whom that descriptive information can be accessed and modified.

Figure 31:
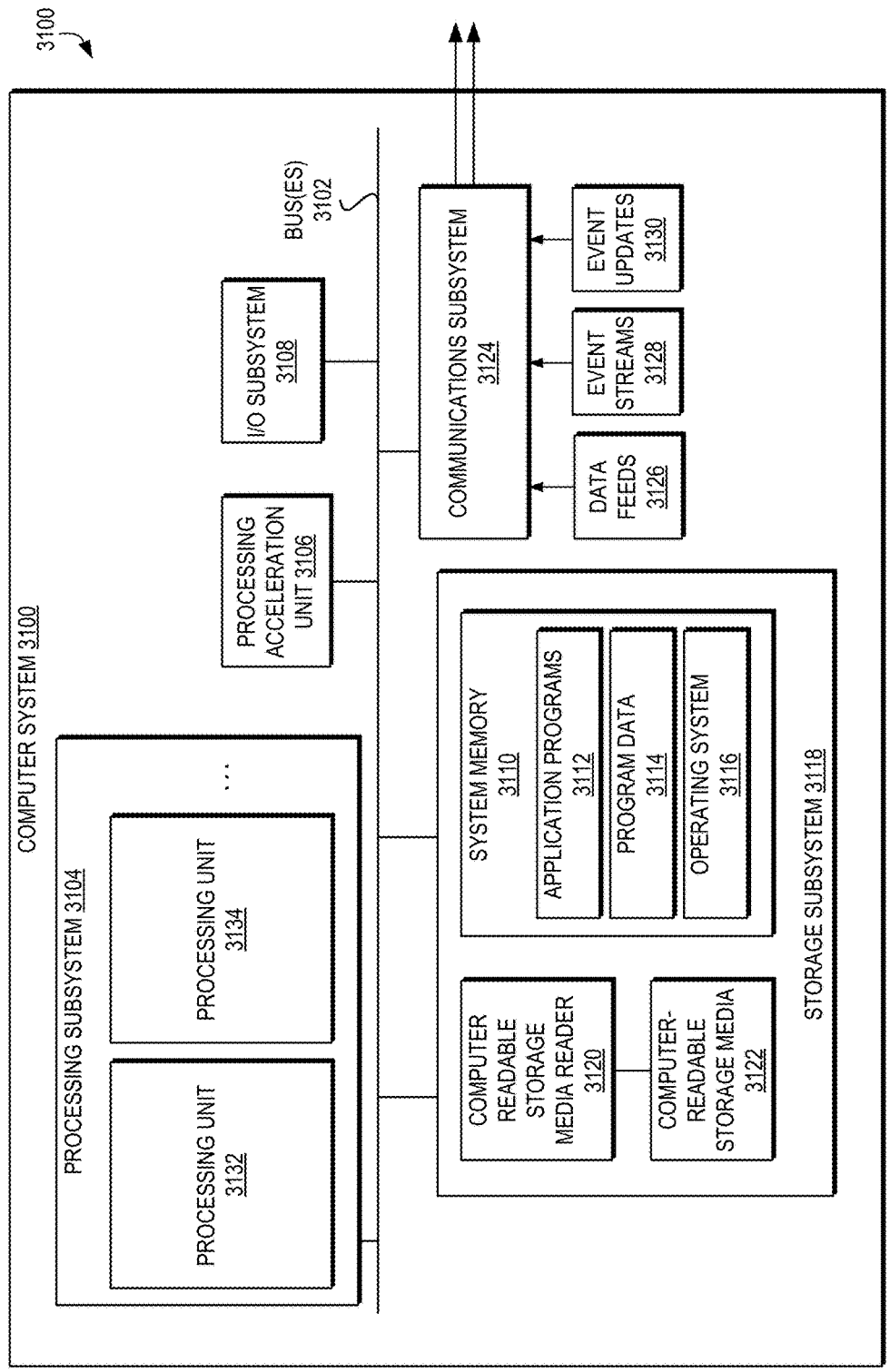
FIG. 31 illustrates an exemplary computer system that may be used to implement certain components according to some embodiments of the present invention.

FIG. 31 illustrates an exemplary computer system 3100 that may be used to implement certain components according to some embodiments of the present invention. In some embodiments, computer system 3100 may be used to implement any of the various servers and computer systems described above. As shown in FIG. 31, computer system 3100 includes various subsystems including a processing unit 3104 that communicates with a number of peripheral subsystems via a bus subsystem 3102. These peripheral subsystems may include a processing acceleration unit 3106, an I/O subsystem 3108, a storage subsystem 3118 and a communications subsystem 3124. Storage subsystem 3118 may include tangible computer-readable storage media 3122 and a system memory 3110.

Bus subsystem 3102 provides a mechanism for letting the various components and subsystems of computer system 3100 communicate with each other as intended. Although bus subsystem 3102 is shown schematically as a single bus, alternative embodiments of the bus subsystem may utilize multiple buses. Bus subsystem 3102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 3104 controls the operation of computer system 3100 and may comprise one or more processing units 3132, 3134, etc. A processing unit may include be one or more processors, including single core or multicore processors, one or more cores of processors, or combinations thereof. In some embodiments, processing subsystem 3104 can include one or more special purpose co-processors such as graphics processors (GPUs), digital signal processors (DSPs), or the like. In some embodiments, some or all of the processing units of processing subsystem 3104 can be implemented using customized circuits, such as application specific integrated circuits (ASICs), or field programmable gate arrays (FPGAs).

In some embodiments, the processing units in processing subsystem 3104 can execute instructions stored in system memory 3110 or on computer readable storage media 3122. In various embodiments, the processing units can execute a variety of programs or code instructions and can maintain multiple concurrently executing programs or processes. At any given time, some or all of the program code to be executed can be resident in system memory 3110 and/or on computer-readable storage media 3122 including potentially on one or more storage devices. Through suitable programming, processing subsystem 3104 can provide various functionalities described above for providing the performance analysis and bottleneck detection in service-oriented applications.

In certain embodiments, a processing acceleration unit 3106 may be provided for performing customized processing or for off-loading some of the processing performed by processing subsystem 3104 so as to accelerate the overall processing performed by computer system 3100.

I/O subsystem 3108 may include devices and mechanisms for inputting information to computer system 3100 and/or for outputting information from or via computer system 3100. In general, use of the term "input device" is intended to include all possible types of devices and mechanisms for inputting information to computer system 3100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 3100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 3118 provides a repository or data store for storing information that is used by computer system 3100. Storage subsystem 3118 provides a tangible non-transitory computer-readable storage medium for storing the basic programming and data constructs that provide the functionality of some embodiments. Software (programs, code modules, instructions) that when executed by processing subsystem 3104 provide the functionality described above may be stored in storage subsystem 3118. The software may be executed by one or more processing units of processing subsystem 3104. Storage subsystem 3118 may also provide a repository for storing data used in accordance with the present invention.

Storage subsystem 3118 may include one or more non-transitory memory devices, including volatile and non-volatile memory devices. As shown in FIG. 31, storage subsystem 3118 includes a system memory 3110 and a computer-readable storage media 3122. System memory 3110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 3100, such as during start-up, may typically be stored in the ROM. The RAM typically contains data and/or program modules that are presently being operated and executed by processing subsystem 3104. In some implementations, system memory 3110 may include multiple different types of memory, such as static random access memory (SRAM) or dynamic random access memory (DRAM).

By way of example, and not limitation, as depicted in FIG. 31, system memory 3110 may store application programs 3112, which may include client applications, Web browsers, mid-tier applications, relational database management systems (RDBMS), etc., program data 3114, and an operating system 3116. By way of example, operating system 3116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 3122 may store programming and data constructs that provide the functionality of some embodiments. Software (programs, code modules, instructions) that when executed by processing subsystem 3104 a processor provide the functionality described above may be stored in storage subsystem 3118. By way of example, computer-readable storage media 3122 may include non-volatile memory such as a hard disk drive, a magnetic disk drive, an optical disk drive such as a CD ROM, DVD, a Blu-Ray® disk, or other optical media. Computer-readable storage media 3122 may include, but is not limited to, Zip® drives, flash memory cards, universal serial bus (USB) flash drives, secure digital (SD) cards, DVD disks, digital video tape, and the like. Computer-readable storage media 3122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. Computer-readable media 3122 may provide storage of computer-readable instructions, data structures, program modules, and other data for computer system 3100.

In certain embodiments, storage subsystem 3100 may also include a computer-readable storage media reader 3120 that can further be connected to computer-readable storage media 3122. Together and, optionally, in combination with system memory 3110, computer-readable storage media 3122 may comprehensively represent remote, local, fixed, and/or removable storage devices plus storage media for storing computer-readable information.

In certain embodiments, computer system 3100 may provide support for executing one or more virtual machines. Computer system 3100 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 3100. Accordingly, multiple operating systems may potentially be run concurrently by computer system 3100. Each virtual machine generally runs independently of the other virtual machines.

Communications subsystem 3124 provides an interface to other computer systems and networks. Communications subsystem 3124 serves as an interface for receiving data from and transmitting data to other systems from computer system 3100. For example, communications subsystem 3124 may enable computer system 3100 to establish a communication channel to one or more client devices via the Internet for receiving and sending information from and to the client devices.

Communication subsystem 3124 may support both wired and/or wireless communication protocols. For example, in certain embodiments, communications subsystem 3124 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 3124 can provide wired network connectivity (e.g., Ethernet) in addition to or instead of a wireless interface.

Communication subsystem 3124 can receive and transmit data in various forms. For example, in some embodiments, communications subsystem 3124 may receive input communication in the form of structured and/or unstructured data feeds 3126, event streams 3128, event updates 3130, and the like. For example, communications subsystem 3124 may be configured to receive (or send) data feeds 3126 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 3124 may be configured to receive data in the form of continuous data streams, which may include event streams 3128 of real-time events and/or event updates 3130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 3124 may also be configured to output the structured and/or unstructured data feeds 3126, event streams 3128, event updates 3130, and the like to one or more databases that may be in communication with one or more streaming data source computers coupled to computer system 3100.

Computer system 3100 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 3100 depicted in FIG. 31 is intended only as a specific example. Many other configurations having more or fewer components than the system depicted in FIG. 31 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication (IPC), and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A service-oriented architecture (SOA) system, comprising:
   one or more client devices, each client device comprising a client processing unit and client memory coupled to and readable by the client processing unit and storing therein a set of instructions which, when executed by the client processing unit, causes the client device transmit transaction requests to and receive responses from one or more application servers of the service-oriented architecture system;
   a plurality of application servers, each application server comprising a server processing unit and memory coupled to and readable by the server processing unit and storing therein a set of instructions which, when executed by the server processing unit, causes the application server to:
      execute an application comprising a plurality of composites interacting within the application, wherein each of the plurality of composites executes independently from the other composites of the application; and
      receive and process transaction requests from the one or more client devices; and
   a computing device comprising:
      a processing unit comprising one or more processors;
      one or more network interfaces communicatively coupled with the one or more processors; and
      memory coupled with and readable by the processing unit and storing therein a set of instructions which, when executed by the processing unit, causes the computing device to:
         calculate one or more performance metrics for the service-oriented architecture (SOA) system during a plurality of time periods;
         detect a performance degradation of the service-oriented architecture system;
         in response to detecting the performance degradation of the service-oriented architecture system, cause the computing device to:
            (a) determine an input flow rate of transactions received at a first composite of the application during a first time period, wherein the first composite of the application comprises a first assembly of one or more component software services and linkages between the one or more component software services and one or more reference software objects, executing on a first application server;
            (b) determine an output flow rate of transactions output by a second composite of the application during the first time period, wherein the second composite of the application comprises a second assembly of one or more component software services and linkages between the one or more component software services and one or more reference software objects, and wherein the second composite of the application executes on a second application server separate from the first application server; and
            (c) determine whether the application is responsible for the performance degradation of the service-oriented architecture system, based on the input flow rate of transactions received at the first composite during the first time period, and based on the output flow rate of transactions output by the second composite during the first time period; and
         in response to determining that the application is responsible for the performance degradation of the SOA system, cause the computing device to:
            (a) isolate one or more process threads of the application; and
            (b) initiate a command to cause the SOA system to alter the execution of the isolated threads of the application.

2. The service-oriented architecture system of claim 1, wherein the determination of whether the application is responsible for the performance degradation of the service-oriented architecture system comprises:
   comparing a first backlog amount of the transactions in a queue for the first composite during the first time period with a second backlog amount for the first composite from a different time period.

3. The service-oriented architecture system of claim 1, wherein the memory of the computing device stores therein additional instructions which, when executed by the processing unit, causes the computing device to:
   determine, for the first time period, a first output flow rate of a first reference endpoint of a third composite of the application that connects with an external computing device; and
   determine, for a different time period, a second output flow rate of the first reference endpoint of the third composite of the application;
   compare the first output flow rate of the first reference endpoint of the third composite with the second output flow rate of the first reference endpoint of the third composite; and
   determine whether the external computing device is causing the performance degradation of the service-oriented architecture system, based on the comparison of the first output flow rate of the first reference endpoint of the third composite with the second output flow rate of the first reference endpoint of the third composite.

4. The service-oriented architecture system of claim 3, wherein the memory of the computing device stores therein additional instructions which, when executed by the processing unit, causes the computing device to:

determine that the external computing device is not causing the performance degradation of the service-oriented architecture system; and identify one of the plurality of composites of the application that is causing the performance degradation of the service-oriented architecture system, based on backlog amounts of a plurality of internal queues of the application.

5. The service-oriented architecture system of claim 4, wherein the memory of the computing device stores therein additional instructions which, when executed by the processing unit, causes the computing device to:

determine that a first component software service of a plurality of component software services of the identified composite is causing the performance degradation of the service-oriented architecture system, based upon component backlog amounts corresponding to the plurality of component software services.

6. The service-oriented architecture system of claim 1, wherein the determination of whether the application is responsible for the performance degradation of the service-oriented architecture system comprises:

determining a request count and a request rate at each of a plurality of input points of the plurality of composites of the application for the first time period, wherein each request count identifies a number of messages received at the corresponding composite during the first time period, and wherein each request rate identifies a number of messages per unit of time that are received at the corresponding composite during the first time period.

7. The service-oriented architecture system of claim 1, wherein the determination of whether the application is responsible for the performance degradation of the service-oriented architecture system comprises:

determining a service queue backlog value and a reference queue backlog value for each of the plurality of composites of the application for the first time period; and determining a component backlog value for each of one or more component software services of each of the plurality of composites for the first time period.

8. The service-oriented architecture system of claim 1, wherein the determination of whether the application is responsible for the performance degradation of the service-oriented architecture system comprises:

determining an average component execution time for each of one or more component software services of each of the plurality of composites of the application, over the first time period; and determining a subcomponent average execution time for each of the one or more component software services of each of the plurality of composites of the application, over the first time period.

9. The service-oriented architecture system of claim 1, wherein the memory of the computing device stores therein additional instructions which, when executed by the processing unit, causes the computing device to:

receive a plurality of processing updates, for the first time period, from the plurality of composites of the application, wherein each of the received processing updates is associated with an entry point or exit point of a corresponding composite and is further associated with a request from a client device;

receive a plurality of queue backlog updates, for the first time period, for a plurality of queues that store data for a plurality of requests from the one or more client devices;

aggregate the plurality of processing updates and the plurality of queue backlog updates into a summary record for the first time period; and store the summary record in a database.

10. A method, comprising:

calculating, by a computing device executing a performance monitor module, one or more performance metrics for a service-oriented architecture (SOA) system during a plurality of time periods, the service-oriented architecture system comprising one or more client devices and one or more application servers configured to execute an application comprising a plurality of composites interacting within the application, wherein each of the plurality of composites executes independently from the other composites of the application;

detecting, by the computing device executing the performance monitor module, a performance degradation of the service-oriented architecture system;

in response to detecting the performance degradation of the service-oriented architecture system:

(a) determining, by the computing device executing the performance monitor module, an input now rate of transactions received at a first composite of the application during a first time period, wherein the first composite of the application comprises a first assembly of one or more component software services and linkages between the one or more component software services and one or more reference software objects, executing on a first application server;

(b) determining, by the computing device executing the performance monitor module, an output flow rate of transactions output by a second composite of the application during the first time period, wherein the second composite of the application comprises a second assembly of one or more component software services and linkages between the one or more component software services and one or more reference software objects, and wherein the second composite of the application executes on a second application server separate from the first application server; and (c) determining, by the computing device executing the performance monitor module, whether the application is responsible for the performance degradation of the service-oriented architecture system, based on the input flow rate of transactions received at the first composite during the first time period, and based on the output flow rate of transactions output by the second composite during the first time period; and in response to determining that the application is responsible for the performance degradation of the SOA system:

(a) isolating one or more process threads of the application; and (b) initiating a command to cause the SOA system to alter the execution of the isolated threads of the application.

11. The method of claim 10, wherein the determination of whether the application is responsible for the performance degradation of the service-oriented architecture system comprises:

comparing a first backlog amount of the transactions in a queue for the first composite during the first time period with a second backlog amount for the first composite from a different time period.

12. The method of claim 10, further comprising:

determining, for the first time period, a first output flow rate of a first reference endpoint of a third composite of the application that connects with an external computing device; and determining, for a different time period, a second output flow rate of the first reference endpoint of the third composite of the application;

comparing the first output flow rate of the first reference endpoint of the third composite with the second output flow rate of the first reference endpoint of the third composite; and determining whether the external computing device is causing the performance degradation of the service-oriented architecture system, based on the comparison of the first output flow rate of the first reference endpoint of the third composite with the second output flow rate of the first reference endpoint of the third composite.

13. The method of claim 12, further comprising:

determining that the external computing device is not causing the performance degradation of the service-oriented architecture system; and identifying one of the plurality of composites of the application that is causing the performance degradation of the service-oriented architecture system, based on backlog amounts of a plurality of internal queues of the application.

14. The method of claim 13, further comprising:

determining that a first component software service of a plurality of component software services of the identified composite is causing the performance degradation of the service-oriented architecture system, based upon component backlog amounts corresponding to the plurality of component software services.

15. A performance monitor device, comprising:

a processing unit comprising one or more processors;

one or more network interfaces communicatively coupled with the one or more processors; and memory coupled with and readable by the processing unit and storing therein a set of instructions which, when executed by the processing unit, causes the performance monitor device to:

calculate one or more performance metrics for a service-oriented architecture (SOA) system during a plurality of time periods, the service-oriented architecture system comprising one or more client devices and one or more application servers configured to execute an application comprising a plurality of composites interacting within the application, wherein each of the plurality of composites executes independently from the other composites of the application;

detect a performance degradation of the service-oriented architecture system;

in response to detecting the performance degradation of the service-oriented architecture system, cause the performance monitor device to:

(a) determine an input flow rate of transactions received at a first composite of the application during a first time period, wherein the first composite of the application comprises a first assembly of one or more component software services and linkages between the one or more component software services and one or more reference software objects;

(b) determine an output flow rate of transactions output by a second composite of the application during the first time period, wherein the second composite of the application comprises a second assembly do one or more component software services and linkages between the one or more component software services and one or more reference software objects, and wherein the second composite of the application executes on a separate computing device from the first composite of the application; and (c) determine whether the application is responsible for the performance degradation of the service-oriented architecture system, based on the input flow rate of transactions received at the first composite during the first time period, and based on the output flow rate of transactions output by the second composite during the first time period; and in response to determining that the application is responsible for the performance degradation of the SOA system, cause the performance monitor device to:

(a) isolate one or more process threads of the application; and (b) initiate a command to cause the SOA system to alter the execution of the isolated threads of the application.

16. The performance monitor device of claim 15, wherein the memory stores therein additional instructions which, when executed by the processing unit, causes the performance monitor device to:

determine, for the first time period, a first output flow rate of a first reference endpoint of a third composite of the application that connects with an external computing device; and determine, for a different time period, a second output flow rate of the first reference endpoint of the third composite of the application;

compare the first output flow rate of the first reference endpoint of the third composite with the second output flow rate of the first reference endpoint of the third composite; and determine whether the external computing device is causing the performance degradation of the service-oriented architecture system, based on the comparison of the first output flow rate of the first reference endpoint of the third composite with the second output flow rate of the first reference endpoint of the third composite.

17. The method of claim 10, further comprising:

in response to detecting the performance degradation of the service-oriented architecture system:

selecting a first potential cause of the performance degradation of the service-oriented architecture system, from a plurality of predetermined potential causes; and determining the first composite and the second composite of the application, based on the selected potential cause of the performance degradation.

18. The method of claim 17, further comprising:

in response to determining that the first potential cause is not responsible for the performance degradation of the service-oriented architecture system:

selecting a second potential cause of the performance degradation of the service-oriented architecture system, from the plurality of predetermined potential causes;

determining a third composite and a fourth composite of the application, based on the selected potential cause of the performance degradation;

determining an input flow rate of transactions received at the third composite of the application during the first time period;

determining an output flow rate of transactions output by the fourth composite of the application during the first time period; and determining whether the application is responsible for the performance degradation of the service-oriented architecture system, based on the input flow rate of transactions received at the third composite during the first time period, and based on the output flow rate of transactions output by the fourth composite during the first time period.

19. The method of claim 18, wherein the selected first potential cause of the performance degradation of the service-oriented architecture system corresponds to one or more slow external synchronous services, and wherein the selected second potential cause of the performance degradation of the service-oriented architecture system corresponds to one or more slow internal synchronous services.

20. The method of claim 10, wherein determining the input flow rate of transactions received at a first composite during a first time period and the output flow rate of transactions output by the second composite comprises:

receiving, at the computing device executing the performance monitor module, a plurality of messages from the first composite and the second composite, each message corresponding to a transaction received at or output by the sender composite, and wherein each message includes a sender location associated with the sender composite.

* * * * *

UNITED STATES PATENT AND TRADEMARK OFFICE
CERTIFICATE OF CORRECTION

PATENT NO. : 10,230,600 B2  
APPLICATION NO. : 14/975100  
DATED : March 12, 2019  
INVENTOR(S) : Malkit Singh Bhasin and Herbert Stiel Page 1 of 1

It is certified that error appears in the above-identified patent and that said Letters Patent is hereby corrected as shown below:

In the Drawings

At Figure 27, Line 5, delete "Eventtye" and insert --Eventtype--

In the Specification

At Column 17, Line 13, "it may be concluded that that" should be changed to --it may be concluded that--

At Column 20, Line 23, "database operations," should be changed to --database operations.--

At Column 21, Line 24, "and/or subcompoents" should be changed to --and/or subcomponents--

At Column 23, Line 2, "all event types" should be changed to --all event types.--

In the Claims

In Claim 10:
At Column 38, Line 23, "an input now rate" should be changed to --an input flow rate--

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*